United States Patent
Solis et al.

(10) Patent No.: US 12,265,576 B2
(45) Date of Patent: Apr. 1, 2025

(54) SYSTEMS AND METHODS FOR MULTILINGUAL INTENT PREDICTION

(71) Applicant: ADA Support Inc., Toronto (CA)

(72) Inventors: Jerome Solis, Montreal (CA); Gordon Gibson, Toronto (CA); Chen Qian, Kitchener (CA)

(73) Assignee: ADA SUPPORT INC., Toronto (CA)

( * ) Notice: Subject to any disclaimer, the term of this patent is extended or adjusted under 35 U.S.C. 154(b) by 211 days.

(21) Appl. No.: 17/939,840

(22) Filed: Sep. 7, 2022

(65) Prior Publication Data

US 2024/0078264 A1  Mar. 7, 2024

(51) Int. Cl.
*G06F 16/9032* (2019.01)
*G06N 5/022* (2023.01)
*G06N 7/01* (2023.01)

(52) U.S. Cl.
CPC ....... *G06F 16/90332* (2019.01); *G06N 5/022* (2013.01); *G06N 7/01* (2023.01)

(58) Field of Classification Search
USPC ...................................................... 704/1–504
See application file for complete search history.

(56) References Cited

U.S. PATENT DOCUMENTS

| | | | | |
|---|---|---|---|---|
| 10,943,583 | B1 * | 3/2021 | Gandhe | G10L 15/183 |
| 11,308,938 | B2 * | 4/2022 | Wieman | G10L 15/063 |
| 11,562,147 | B2 * | 1/2023 | Wang | G06F 18/21 |
| 11,769,011 | B2 * | 9/2023 | Yang | G06N 20/00 |
| | | | | 704/9 |
| 11,769,488 | B2 * | 9/2023 | Krishnaswamy | G10L 15/187 |
| | | | | 704/243 |
| 12,067,006 | B2 * | 8/2024 | Singh | G06N 3/08 |
| 2020/0050667 | A1 * | 2/2020 | Lin | G06F 16/35 |
| 2021/0174783 | A1 * | 6/2021 | Wieman | G10L 13/02 |
| 2022/0189464 | A1 * | 6/2022 | Krishnaswamy | G10L 15/187 |
| 2023/0107065 | A1 * | 4/2023 | Le | G06N 3/0455 |
| | | | | 704/9 |
| 2023/0108469 | A1 * | 4/2023 | Le | G06F 18/2321 |
| | | | | 709/206 |
| 2024/0078264 | A1 * | 3/2024 | Solis | G06N 3/045 |

OTHER PUBLICATIONS

Google Internet: "Multilingual agents," 5 pages, Retrieved from the Internet: https://cloud.google.com/dialogflow/es/docs/agents-multilingual, 2022.

Google Internet: Yang, Yinfei, et al., "Language-Agnostic BERT Sentence Embedding," 2020, 5 pages, Retrieved from the Internet: https://ai.googleblog.com/2020/08/language-agnostic-bert-sentence.html.

\* cited by examiner

*Primary Examiner* — Marcus T Riley

(74) *Attorney, Agent, or Firm* — Womble Bond Dickinson (US) LLP

(57) ABSTRACT

A method includes: receiving a user query; generating first embedding data for the user query via a language agnostic machine learning embedding model; and predicting a first intent of the user query based on the first embedding data.

16 Claims, 11 Drawing Sheets

SYSTEMS AND METHODS FOR MULTILINGUAL INTENT PREDICTION

BACKGROUND

1. Field

Aspects of one or more embodiments of the present disclosure relate to natural language processing, and more particularly, to systems and methods for multilingual intent classification predictions.

2. Description of Related Art

A business may employ automated systems and representatives of the business to process transactions and/or service the needs of its customers. Utilizing human agents to interact with the customers may sometimes result in delays if the agents are not available to service the customers. Utilizing human agents may also be costly for the business due to increased overhead and increased complexity to the business operation.

One mechanism for handling customer needs in a more efficient manner may be to employ chatbots. Using chatbots, however, may be challenging, especially when having to service customers in multiple different languages. For example, if a chatbot has not been trained in a particular language, the chatbot may be unable to service customers in the particular language.

The above information disclosed in this Background section is for enhancement of understanding of the background of the present disclosure, and therefore, it may contain information that does not constitute prior art.

SUMMARY

One or more embodiments of the present disclosure are directed to systems and methods for multilingual intent predictions using a language agnostic model that is pre-trained on translation tasks in a language translation domain and fine-tuned on chatbot domain data.

One or more embodiments of the present disclosure are directed to systems and methods for multilingual intent predictions using a unilingual language model that is trained on intent inference tasks in a chatbot domain to output intent classification predictions in tandem with those of the pre-trained language agnostic model.

According to one or more embodiments of the present disclosure, a method includes: receiving a user query; generating first embedding data for the user query via a language agnostic machine learning embedding model; and predicting a first intent probability distribution for the user query based on the first embedding data.

In an embodiment, the language agnostic machine learning embedding model may be a pretrained language agnostic bidirectional encoder representations from transformers (BERT) model.

In an embodiment, the first embedding data may include vector representations of text in the user query.

In an embodiment, the first intent probability distribution for the user query may be predicted by a first classification model based on the vector representations in the first embedding data.

In an embodiment, the method may further include: generating second embedding data for the user query via a unilingual machine learning embedding model; and predicting a second intent probability distribution for the user query based on the second embedding data. The second intent may correspond to the first intent.

In an embodiment, the unilingual machine learning embedding model may include a plurality of embedding layers, and the second embedding data may include a plurality of embeddings corresponding to features of the user query embedded by the embedding layers.

In an embodiment, the method may further include generating a feature vector by concatenating the plurality of embeddings.

In an embodiment, the second intent probability distribution for the user query may be predicted by a second classification model based on the feature vector.

In an embodiment, the method may further include: applying weights to the first intent probability distribution and the second intent probability distribution; and calculating a weighted average between the first intent probability distribution and the second intent probability distribution based on the weights.

In an embodiment, the method may further include translating the user query from a first language to a second language understood by the unilingual machine learning embedding model. The generating of the first embedding data for the user query may be based on the user query in the first language, and the generating of the second embedding data for the user query may be based on the user query translated to the second language.

According to one or more embodiments of the present disclosure, a system includes: one or more processors; and memory including instructions that, when executed by the one or more processors, cause the one or more processors to: receive a user query in a first language; predict a first intent probability distribution for the user query in the first language; translate the user query into a second language different from the first language; predict a second intent probability distribution for the user query in the second language, the second intent corresponding to the first intent; calculate a weighted average between the first intent probability distribution and the second intent probability distribution; and output a response to the user query based on the weighted average.

In an embodiment, the instructions may further cause the one or more processors to generate first embedding data for the user query in the first language, and the predicting of the first intent probability distribution may be based on the first embedding data.

In an embodiment, the first embedding data may be generated by utilizing a pretrained language agnostic bidirectional encoder representations from transformers (BERT) model.

In an embodiment, the first embedding data may include vector representations of text in the user query.

In an embodiment, the first intent probability distribution for the user query may be predicted utilizing a first support vector machine based on the vector representations in the first embedding data.

In an embodiment, the instructions may further cause the one or more processors to generate second embedding data for the user query in the second language, and the predicting of the second intent probability distribution may be based on the second embedding data.

In an embodiment, the second embedding data may be generated via a plurality of embedding layers, and may include a plurality of embeddings corresponding to features of the user query embedded by the embedding layers.

In an embodiment, the instructions may further cause the one or more processors to generate a feature vector by concatenating the plurality of embeddings.

In an embodiment, the second intent probability distribution for the user query may be predicted utilizing a second support vector machine based on the feature vector.

According to one or more embodiments of the present disclosure, a system includes: a pretrained language agnostic transformers model configured to generate first embeddings of a user query received in a first language; a plurality of embedding layers configured to generate second embeddings of the user query in a second language different from the first language; a first classification model configured to predict a first intent probability distribution for the user query based on the first embeddings; a second classification model configured to predict a second intent probability distribution for the user query based on the second embeddings, the second intent corresponding to the first intent; and a weighted average calculator configured to calculate a weighted average between the first intent probability distribution and the second intent probability distribution. The weighted average is used to generate a response to the user query.

In an embodiment, the first classification model and the second classification model may be trained based on training examples in a combination of different languages, the first classification model may be trained based on an original language of the training examples, and the second classification model may be trained based on a machine translation of the training examples from the original language to the second language, when the original language is different from the second language.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
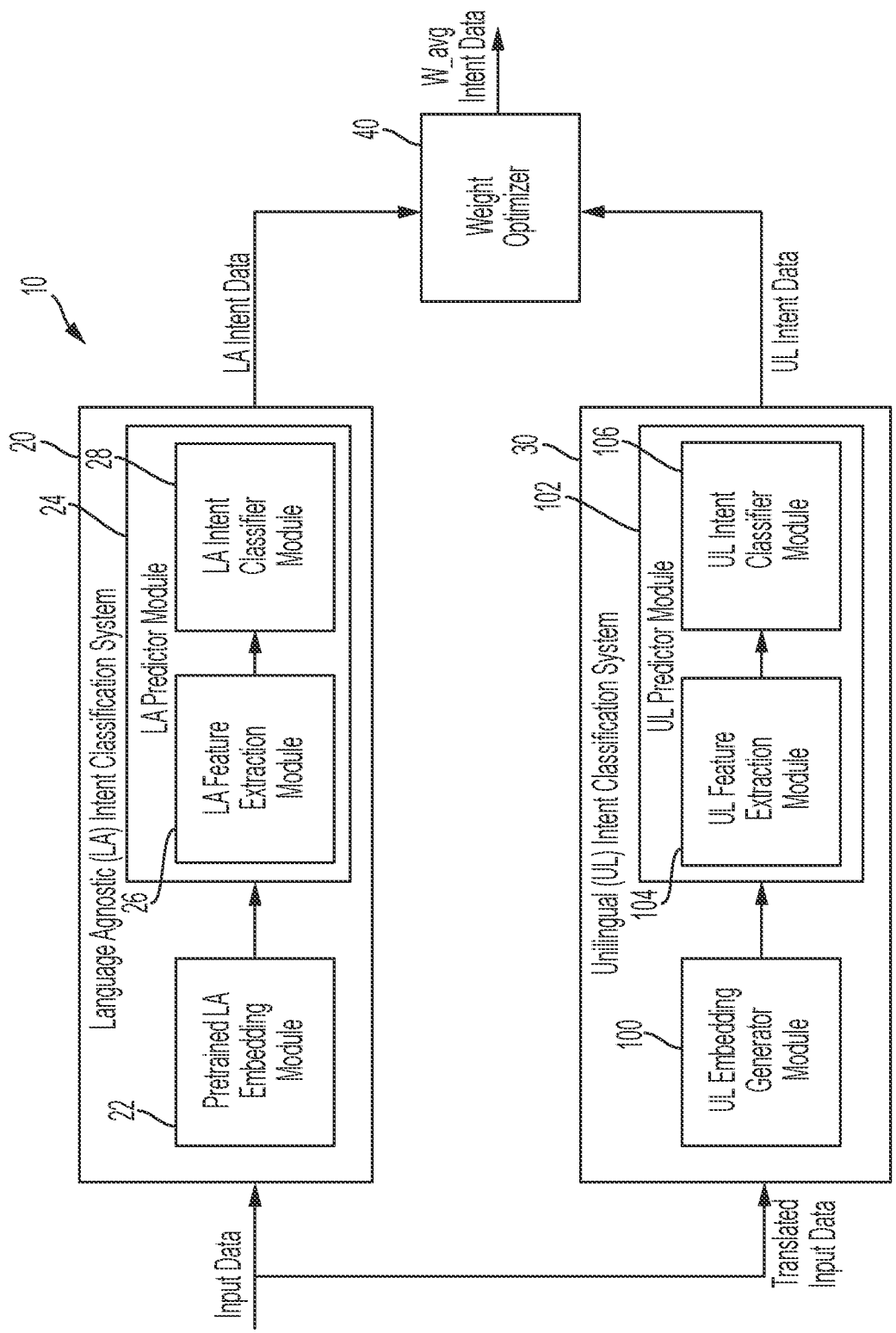
FIG. 1 is a block diagram of a multilingual intent classification system according to one or more embodiments.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

A business may employ an automated answering system, a chat bot, a chat robot, a chatterbot, a dialog system, a conversational agent, and/or the like (collectively referred to as a chatbot) to interact with customers. Customers may use natural language to pose questions to the chatbot, desirably in a preferred language of the customers, and the chatbot may provide answers (e.g., in the preferred language) that are aimed to be responsive to the questions. However, the languages in which the chatbot may service the customers may depend on the training received by the chatbot. If the chatbot is not trained to understand a preferred language of a user's question, it may be unable to service the user's question in the preferred language, which may lead to decreased customer satisfaction. Training chatbots to understand a different language, however, can be an arduous task, especially when having to train the chatbots to support multiple different languages.

For example, in order to train a chatbot system to make intent predictions in multiple different languages, training data in each of the various different languages may typically be required. In this case, a separate machine learning system for each of the multiple different languages may be configured and trained using the training data in each corresponding different language. For example, in order for a chatbot system to support English, French, and Spanish, the chatbot system may require an English machine learning system as well as an English training dataset, a French machine learning system as well as a French training dataset, and a Spanish machine learning system as well as a Spanish training dataset. Thus, to expand past a unilingual use case, duplicated efforts for at least 2 components may be required for each supported language.

However, training data sets for an intent prediction task (e.g., a chatbot domain) may not be well defined for each of the multiple different languages, and thus, may lead to increased costs and time in order to generate suitable training data sets in each of the multiple different languages. Moreover, the amount of resources and setup time needed to configure and train multiple machine learning systems to support each of the multiple different languages may be cost and time prohibitive. Accordingly, there may be a need for systems and methods to quickly and sufficiently train chatbots to service customers in multiple different languages. As a person of skill in the art should appreciate, efficient and effective training of chatbots result in more efficient and effective interactions with users of the chatbot.

Generally, embodiments of the present disclosure are directed to systems and methods for multilingual intent predictions (e.g., intent classifications or intent classification predictions) of user questions in various different languages. The term "questions" is used herein to also refer to utterances, queries, requests, or other types of inputs from a user, and is not limited to just questions. Accordingly, the terms questions, utterances, queries, and inputs will be used interchangeably herein.

In some embodiments, a multilingual intent classification system receives one or more user questions in any suitable (e.g., user preferred) language, and attempts to classify the questions into one or more user intents to provide answers in the suitable language. The intents may be answers, or may be used to generate answers, that the chatbot may output in the suitable language to respond to the user's questions.

For example, in some embodiments, the multilingual intent classification system may include a language agnostic (LA) intent classification system that receives input data in any suitable (e.g., user preferred) language, and predicts an intent (e.g., LA intent data) for the input data. The intent may be predicted based on sentence embeddings generated by a language agnostic (LA) embedding model that is pretrained to perform translation ranking tasks in a language translation domain. Because the LA intent classification system may already be pretrained to understand text translations and sentence structures in multiple different languages, the LA intent classification system may be quickly and efficiently fine-tuned during training to make intent classification predictions in multiple different languages based on a labeled training data set in any suitable language.

In some embodiments, the multilingual intent classification system may further include a unilingual (UL) intent classification system that is more specifically trained in a predefined (e.g., a particular) language to make intent classification predictions in tandem (e.g., concurrently or sequentially) with those made by the LA intent classification system. For example, because labeled training data may already be well defined for intent classification training in the predefined language (e.g., English), the UL intent classification system may be specifically trained in the predefined language to make the intent classification predictions. Further, any input data and/or training data that is in a language different from the predefined language may first be machine translated into the predefined language before being input to the UL intent classification system. Thus, any potential translational errors may be compensated by the intent classification predictions (e.g., the LA intent data) output by the LA intent classification system, and any potential intent classification errors output by the LA intent classification system may be compensated by the intent classification predictions (e.g., UL intent data) output by the UL intent classification system.

In some embodiments, the intent classification predictions output by the LA intent classification system and the UL intent classification system may be combined with each other to produce a weighted average. For example, in some embodiments, the multilingual intent classification system may include a weight optimizing module (e.g., a weight optimizer) that is trained to apply suitable weights (e.g., biases) to the intent classification predictions output by each of the LA intent classification system and the UL intent classification system, and to calculate the weighted average based on the suitable weights. Thus, during training, the weight optimizing module may determine (e.g., for a particular language, industry, and/or customer) which one of the LA intent classification system or the UL intent classification system makes more accurate predictions, and thus, the output predictions should be given more weights. Accordingly, in some embodiments, the predictions made by the LA intent classification system and the UL intent classification system may supplement each other, such that the intent classification predictions made by the multilingual intent classification system may be improved for any suitable language.

The above and other aspects and features of the present disclosure will be described in more detail hereinafter with reference to the figures.

FIG. 1 is a block diagram of a multilingual intent classification system according to one or more embodiments. For example, FIG. 1 illustrates the multilingual intent classification system 10 for implementing and performing an intent classification method for an inference task to a question posed in any suitable language, according to one or more embodiments. Because the example embodiment in FIG. 1 is for the inference task, one or more machine learning and artificial intelligence models may be configured during training to perform the desired inference task. Training is a process in machine learning and artificial intelligence that generates a model with learnable parameters optimized on a training dataset to perform a task (e.g. generating a chatbot model that analyzes questions and categorizes the questions into intents for further processing). Inference, on the other hand, is a process in machine learning and artificial intelligence that uses the model generated in training to perform the task (e.g. using the generated chatbot model at run-time to analyze questions asked by users and categorize the questions into intents).

During inference, the multilingual intent classification system 10 receives input data of an utterance or question, such as, "what is my order status," "I need to make a payment," "Can I get a refund on a duplicate payment?", and/or the like. The input data may be received in any suitable (e.g., user preferred) language. After processing the input data, the multilingual intent classification system 10 outputs intent data, classifying each question into an intent. In one embodiment, the multilingual intent classification system 10 predicts an intent for the input data received in any suitable language. For example, predicted intents for the above questions may be "order status," "making payment," and "duplicate payment." Further, each intent may represent multiple questions. For example, "How do I get my money back?", "What's your refund policy?", can both be associated with the "refund" intent. The intent may be a label to a question. It will be appreciated that the intent need not be in a human-understandable text (e.g. order status), but it may be an alphanumeric string, a number, or any string representing the label.

In some embodiments, the multilingual intent classification system 10 includes a language agnostic (LA) intent classification system 20. The LA intent classification system 20 is "language agnostic" in the sense that it can process the received input data in any particular language in order to perform the intent classification. In other words, the LA intent classification system 20 may receive the input data in any suitable (e.g., user preferred) language as-is (e.g., without it first being translated), and may output language agnostic (LA) intent data based on the input data.

For example, in some embodiments, the LA intent classification system 20 may include a pretrained LA embedding module 22 and an LA predictor module 24. The pretrained LA embedding module 22 may include a pretrained language agnostic (LA) embedding model that uses machine learning and artificial intelligence. For example, the pretrained LA embedding model 22 may include a bidirectional encoder representations from transformers (BERT) model (also referred to as an LA-BERT embedding model), that is pretrained to perform translation ranking tasks (e.g., a language translation domain) in a multilingual sentence embedding space.

For example, in some embodiments, the LA-BERT embedding model is tasked with performing the translation ranking task using a dual encoder architecture with a shared transformer encoder. Given the input data in a source language, the LA-BERT embedding model may be trained to rank true translations of the input data over a collection of sentences in a target language. This pre-training allows the network to generate embeddings that correspond to semantic vector representations of the input data in various given languages. In other words, the LA-BERT embedding model may treat all languages as one, and may generate a semantic vector representation of the text in the input data, such that similar meaning texts will have similar vector representations.

One example of such pretrained LA-BERT embedding model includes "Language Agnostic BERT Sentence Embedding" generated by Google™, and available at (Google AI Blog, https://ai.googleblog.com/2020/08/language-agnostic-bert-sertence.html, Aug. 18, 2020), which is incorporated by reference herein in its entirety. It is understood that the disclosed pre-trained LA-BERT embedding model can be used in some examples. Other pre-trained language agnostic models can be used in other examples. For example, while the translation ranking task is provided as one example pretraining method of the pre-trained language agnostic model, the present disclosure is not limited thereto, and the pre-training task may include any suitable neural machine translation task including, for example, 1:1 or M:N language translation, translation ranking, and/or the like, where M and N are each natural numbers greater than 1.

In some embodiments, the pre-trained language agnostic model (e.g., the LA-BERT embedding model) may be fine-tuned in an intent inference task domain. For example, in some embodiments, during training, the pretrained LA embedding module 22 may generate additional layers on top of the pre-trained language agnostic model. These additional layers are used to train the pre-trained language agnostic model for additional tasks, for example, such as classification, translations, and/or the like. The additional layers may then be discarded after the training, such that the embeddings output by the pre-trained language agnostic model may further include embeddings for the additional tasks, such as for intent classifications. Accordingly, the embeddings output by the fine-tuned LA-BERT embedding model may be different from the original embeddings output based on the translation ranking tasks alone.

The LA predictor module 24 may predict and output an intent (e.g., a first intent, a first intent probability distribution, or LA intent data) based on the sentence embeddings generated by the pretrained LA embedding module 22. For example, in some embodiments, the LA predictor module 24 includes an LA feature extraction module 26 and an LA intent classifier module 28. The LA feature extraction module 26 may extract feature vectors from the sentence embeddings, and the feature vectors may be used to train an LA intent classifier model of the LA intent classifier module 28 to predict and output the LA intent (e.g., the first intent) of the input data. In some embodiments, the LA feature extraction module 26 may be omitted, and the LA intent classifier model may be trained to predict and output the LA intent of the input data based on the sentence embeddings output by the pretrained LA-BERT embedding model.

In some embodiments, because the LA intent predicted by the LA predictor module 24 may be based on the sentence embeddings output by the LA-BERT embedding model, which may be pretrained to perform the translation ranking tasks (e.g., a language translation domain), even though the LA predictor module 24 (and/or the pretrained LA embedding module 22) may be trained (e.g., and/or fine-tuned) for intent classification tasks, the predicted LA intent may be sub-optimal (e.g., may be less accurate) for producing sufficient responses (e.g., answers) to the user's query in some use cases. Accordingly, in some embodiments, the multilingual intent classification system 10 may further include a unilingual (UL) intent classification system 30 to make intent predictions in tandem (e.g., concurrently or sequentially) with those of the LA intent classification system 20. For example, in some embodiments, the UL intent classification system 30 may also predict an intent (e.g., a second intent, a second intent probability distribution, or UL intent data) based on the input data, and the LA intent and the UL intent may supplement each other in a weighted average W_avg, such that the intent predictions of the multilingual intent classification system 10 may be improved for any suitable language. In other words, the LA intent classification system 20 and the UL intent classification system 30 may be complementary, where one may be better at understanding various different languages, and the other may be better at chatbot domain in one particular language.

For example, in some embodiments, the UL intent classification system 30 may be trained in a predetermined language (e.g., a particular language, such as English) to perform intent inference tasks (e.g., a chatbot domain), based on available training data sets for such inference tasks in any suitable language. In some embodiments, if the training data set is in a different language from that of the predetermined language (e.g., such as English) understood by the UL intent classification system 30, the training data set may first be machine translated into the predetermined language before being used to train the UL intent classification system 30 for that different language. Likewise, during inference, if the query or utterance is received in a language different from the predetermined language, the query or utterance may first be machine translated into the predetermined language before being provided to the UL intent classification system 30 for the intent classification inference thereof. In other words, the UL intent classification system 30 may be trained based on plentiful training data for intent inference tasks that may have already been created in any language, rather than being trained based on training data generated in each specific language that the multilingual intent classification system 10 is to support.

In some embodiments, the UL intent classification system 30 may be implemented similarly to the intent classification system 100 described in U.S. application Ser. No. 17/361,114, filed on Jun. 28, 2021, entitled "Method and System for Generating an Intent Classifier," the entire content of which is incorporated by reference herein. An example of the UL intent classification system 30 according to some embodiments is described in further detail below with reference to FIGS. 3-5.

For example, in some embodiments, the UL intent classification system 30 includes a UL embedding generator module 100 and a UL predictor module 102. The UL predictor module 102 includes a UL feature extraction module 104 and a UL intent classifier module 106. As described in more detail below, the UL embedding generator module 100 may include a multi-task deep neural network fine-tuned BERT (MT-DNN-BERT) language model that uses machine learning and artificial intelligence. The MT-DNN-BERT language model is generated during training as described in more detail below. In one embodiment, the output of the UL embedding generator module 100 includes embeddings, each embedding being a multi-dimensional matrix that includes token embeddings, which are described in more detail below. Each embedding may be a unique representation of the input data (or the translated input data).

The UL feature extraction module 104 may implement a method to extract a feature vector from the embeddings output by the UL embedding generator module 100. The method performed by the UL feature extraction module 104 is described in more detail below with reference to FIG. 5. In one embodiment, the UL intent classifier module 106 includes a UL intent classifier model that uses machine learning and artificial intelligence. The UL intent classifier model is generated during training. The UL intent classifier model may receive feature vectors of the question from the UL feature extraction module 104, and predict and output the intent (e.g., the UL intent data).

In some embodiments, to suitably combine the LA intent data with the UL intent data to form a weighted average W_avg, the multilingual intent classification system 10 may further include a weight optimization module (e.g., a weight optimizer) 40, which will be described in more detail below with reference to FIGS. 6 and 7. The weight optimizer 40 may include a weight optimization model that uses machine learning and artificial intelligence. The weight optimization model is generated during training to determine weights (e.g., biases) to be applied to the LA intent data and the UL intent data in order to calculate a suitable weighted average W_avg of the intent data that is used to generate answers to the questions. Accordingly, the predictions (e.g., LA intent data) output by the LA intent classification system 20, which may be pretrained in the language translation domain, and the predictions (e.g., UL intent data) output by the UL intent classification system 30, which may be trained in the chatbot domain, may be combined with each other by the weight optimizer 40 to improve performance of the intent inference task for any suitable language.

Figure 2:
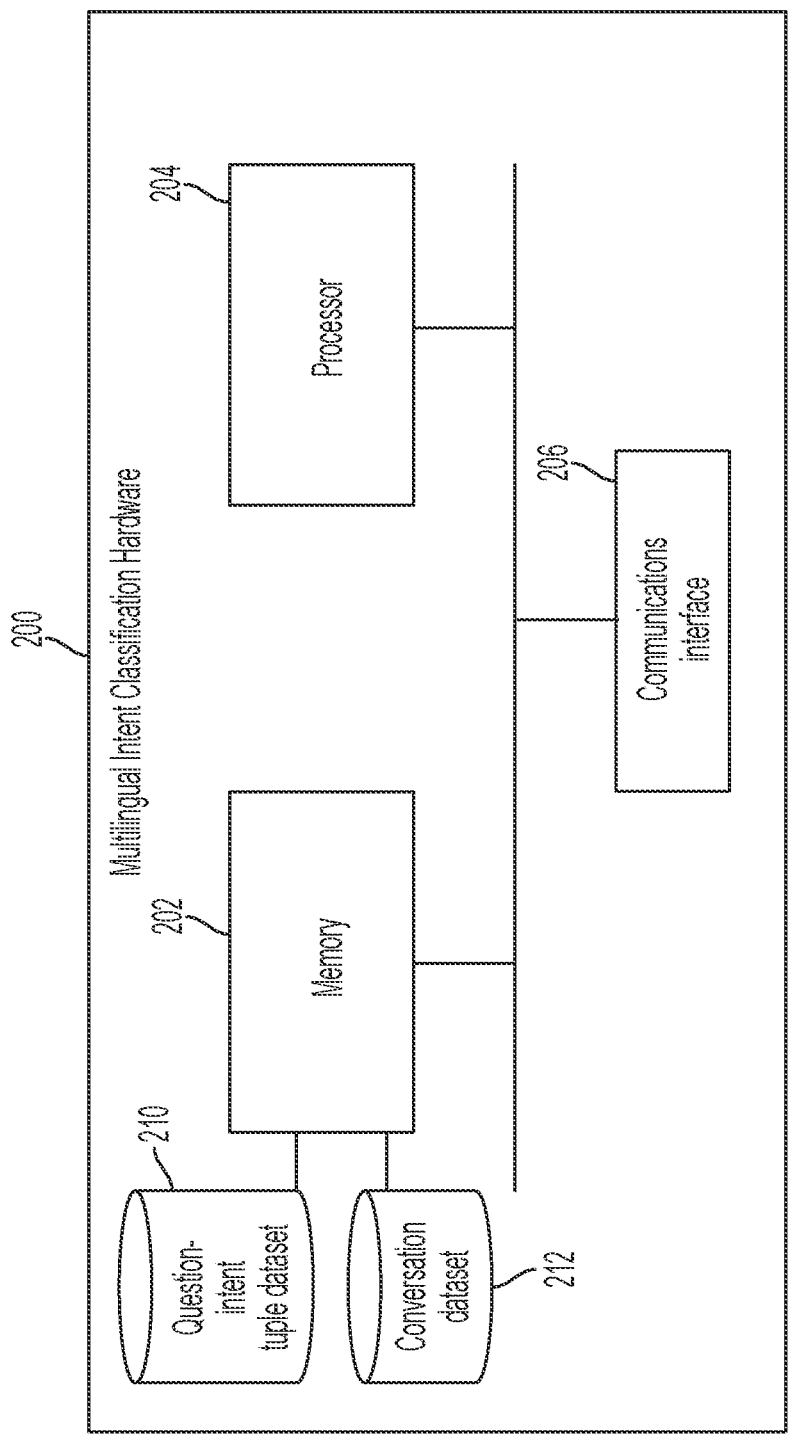
FIG. 2 is a schematic diagram of hardware implementing the multilingual intent classification system, according to one or more embodiments.

FIG. 2 is a schematic diagram of hardware implementing the multilingual intent classification system 10, according to one or more embodiments. The multilingual intent classification hardware 200 includes a memory 202, a processor (e.g., one or more processors) 204, and a communications interface 206. A communication connection is implemented between the memory 202, the processor 204, and the communications interface 206, for example, using a bus. The processor 204 is configured to perform, when the computer program stored in the memory 202 is executed by the processor 204, processes of the multilingual intent classification method for an inference task as detailed in FIG. 1, and processes of the multilingual intent classification method during training as described in FIGS. 3, 4, 5, 6, and 7 below.

The memory 202 can be a read-only memory (Read-Only Memory, ROM), a static storage device, a dynamic storage device, or a random access memory (Random Access Memory, RAM). The memory 202 may store a computer program. The memory 202 can be non-transitory memory. The memory 202 can be external or removable in some examples. In an example, the memory 202 includes the question-intent tuple dataset 210. In an example, the memory 202 includes the conversation dataset 212. In an example, the memory 202 may further include a ground truth verification dataset 600, which is described in more detail below with reference to FIG. 6. In other examples, the question-intent tuple dataset 210 and/or the ground truth verification dataset 600 is external to the multilingual intent classification hardware 200.

The processor 204 can be a general central processing unit (Central Processing Unit, CPU), a microprocessor, an application-specific integrated circuit (Application Specific Integrated Circuit, ASIC), a graphics processing unit (graphics processing unit, GPU), or one or more integrated circuits. The processor 204 may be an integrated circuit chip with a signal processing capability. In an implementation process, processes of the multilingual intent classification method during training or inference making as described herein can be performed by an integrated logical circuit in a form of hardware or by an instruction in a form of a computer program in the processor 204. In addition, the processor 204 can be a general-purpose processor, a digital signal processor (Digital Signal Processor, DSP), an ASIC, a field-programmable gate array (Field Programmable Gate Array, FPGA) or another programmable logic device, a discrete gate or a transistor logic device, or a discrete hardware assembly. The processor 204 can implement or execute the methods, steps, and logical block diagrams that are described in example embodiments. The general-purpose processor can be a microprocessor, or the processor may be any conventional processor or the like. The processes of the multilingual intent classification method during training or inference making may be directly performed by a hardware decoding processor or may be performed by using a combination of hardware in the decoding processor and a computer program module. The computer program module may be located in a mature storage medium in the art, such as a random access memory, a flash memory, a read-only memory, a programmable read-only memory, an electrically erasable programmable memory, or a register. The storage medium is located in the memory 202. The processor 204 reads information from the memory 202, and completes, by using hardware in the processor 204, the processes of the multilingual intent classification method during training or inference making.

The communications interface 206 implements communication between the multilingual intent classification hardware 200 and another device or communications network using a transceiver apparatus, including but not limited to a transceiver. For example, the training dataset (e.g., the question-intent tuple dataset 210, the conversation dataset 212, or the ground truth verification dataset 600) may be obtained using the communications interface 206.

It should be noted that, although the memory 202, the processor 204, and the communications interface 206 are shown in the multilingual intent classification hardware 200 in FIG. 2, in a specific implementation process, a person skilled in the art should understand that the multilingual intent classification hardware 200 may further include other components that are necessary for implementing normal running. In addition, based on specific needs, a person skilled in the art should understand that the multilingual intent classification hardware 200 may further include hardware components that implement other additional functions. In addition, a person skilled in the art should understand that the multilingual intent classification hardware 200 may include only a component required for implementing the embodiments, without a need to include all the components shown in FIG. 1.

Figure 3:
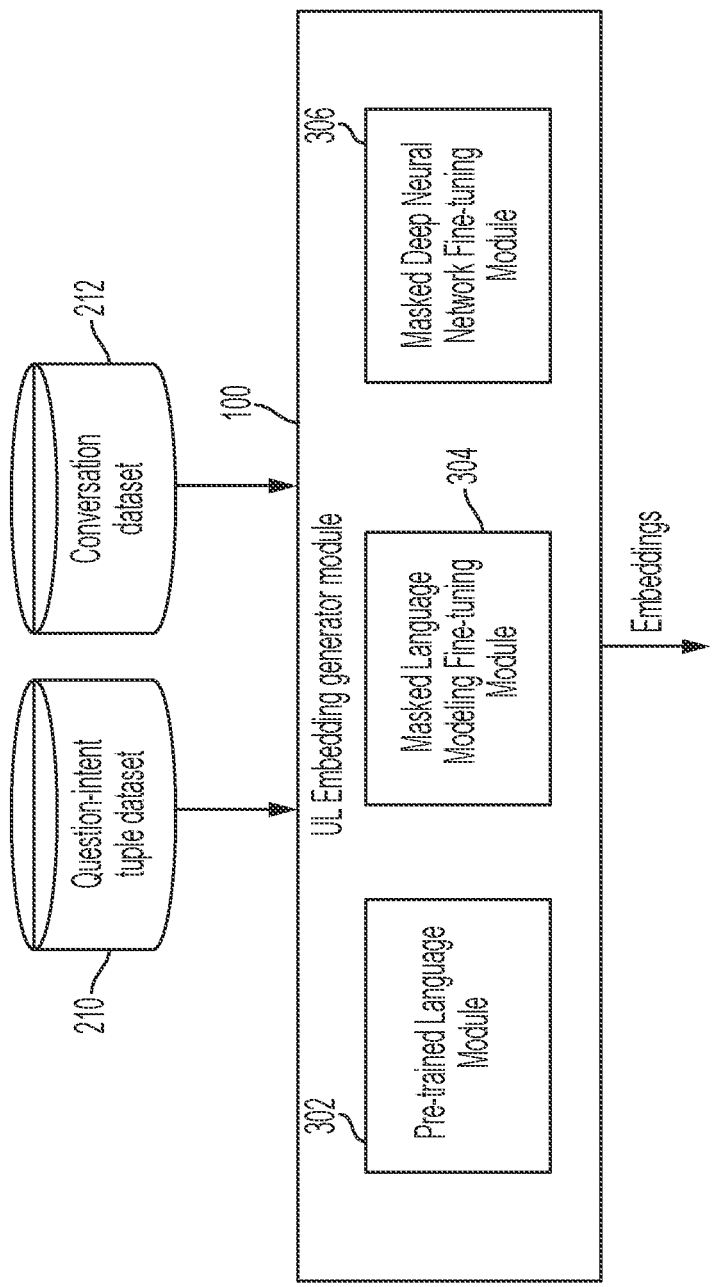
FIG. 3 illustrates a block diagram of an example method implemented in a unilingual embedding generator module during training, according to one or more embodiments.

FIG. 3 illustrates a block diagram of an example method implemented in the unilingual (UL) embedding generator module 100 during training, according to one or more embodiments. FIG. 1 describes the UL embedding generator module 100 during inference making (e.g., performing an inference task). As described above, the UL embedding generator module 100 includes the MT-DNN-BERT language model generated, through training, to achieve a specific task (e.g. predict intents). FIG. 3 describes an example method for generating, through training, the MT-DNN-BERT language model. The training requires training datasets, which contain texts (e.g. questions, utterances, and/or the like, interchangeably, input data). Two training datasets can be used to generate the MT-DNN-BERT language model, the question-intent tuple dataset 210 and the conversation dataset 212. The question-intent tuple dataset 210 is a labelled dataset consisting of data samples, each data sample having a question, an intent, and a task. The question-intent tuple dataset 210 is typically in a predetermined language understood by the unilingual (UL) embedding generator module 100, but in some embodiments, may be machine translated into the predetermined language.

The questions are text questions asked by users of chatbots. The intents are unique identifiers representing coherent groups of questions, as described above. Each question is usually mapped to a single intent. These questions and intents may be collected from different sources (e.g. chatbots) across different domains and industries (e.g. finance, logistics, education, transportation, etc.). The data samples, including questions and intents, of each source are assigned a unique task. Therefore, each data sample includes a question, an intent for the question, and a task representing the source (chatbot from an enterprise). Typically, data samples collected from a same source (same source chatbot) have a same task value. Data samples collected from the same industry are from the same source, hence, have a same task value. In other words, the question-intent tuple dataset 210 comprises a plurality of sub-datasets; each sub-dataset is collected from a source. For example, data samples collected from chatbot 1 may be assigned with a task value of 1, data samples collected from chatbot 2 may be assigned with a task value of 2, and the like. The conversation dataset 212 is an unlabeled dataset that comprises data samples of conversation messages collected from users of chatbots.

The UL embedding generator module 100 and its components are now described in more detail. It receives training datasets as input and output embeddings for data samples. The UL embedding generator module 100 includes three modules, a pre-trained language module 302, a masked language modelling fine-tuning module 304, and a multi-task deep neural network fine-tuning module 306. The pre-trained language module 302 includes a pre-trained language model that uses machine learning and artificial intelligence. The pre-trained language model may be BERT, which may be a bidirectional encoder representations from transformers proposed by Devlin, Jacob, et al. "Bert: Pre-training of deep bidirectional transformers for language understanding." arXiv preprint arXiv:1810.04805 (2018), incorporated by reference herein in its entirety.

The pre-trained language model, BERT in some examples, is a machine-learning based embedding generation technique. The pre-trained language model comprises a plurality of embedding layers, each generating an embedding. Each embedding layer performs computations on the embedding of the previous embedding layer. Therefore, the pre-trained language model receives a word or a collection of words and generates embeddings for each word and the collection of words. Each question of a data sample of the question-intent tuple dataset 210 or a data sample of the conversation dataset 212 may be called a sentence, which is a plurality of words. The words of a sentence typically have a relationship to each other based on their relative positions in a sequence of words (e.g., in a sentence). The sentence may also include non-words, such as symbols (e.g., "?", "!", "@", "#", and other punctuation marks), whitespace or numeric characters.

The pre-trained language module 302 can also include a tokenizer that tokenizes each sentence, wherein tokenization is a technique that separates the sentence into units referred to as tokens. For example, the sentence may be the text string "Hello, check order!". This sentence may be tokenized into the tokens "Hello", "check", and "order". Each token is represented with a unique identifier (ID). The pre-trained language model may further process the tokenized sentence into a dense vector representation of each token, referred to as a token embedding. Therefore, an embedding is a numerical matrix representation of a sentence. Each embedding comprises a plurality of token embeddings. Each token embedding is a numerical vector representation of a token. Further, each embedding has a separate token called a classification token representing the sentence as a whole.

The tokenized words are provided to the pre-trained language model to generate embeddings. Embeddings of semantically related tokens are closer to each other in a vector space (where the vector space is defined by all embeddings generated from sentences). For example, a first embedding representing the token "Hello" and a second embedding representing the token "Hi" should be closer to each other in the vector space when compared to the distance between the first embedding representing the token "Hello" and a third embedding representing the token "Dog."

The dimensionality of each embedding depends on the pre-trained language model used to generate the embedding; in particular, the vector length of the token embedding depends on the number of hidden units per embedding layer of the pre-trained language model. The dimensionality of all token embeddings may be the same. An example embodiment can use BERT-Large Uncased (24 embedding layers, 1024 hidden units), BERT-Large Cased (24 embedding layers, 1024 hidden units), BERT-Base Uncased (12 embedding layers, 768 hidden units), BERT-Large Uncased (24 embedding layers, 1024 hidden units), BERT-Base Cased (12 embedding layers, 768 hidden units), and BERT-Large Cased (24 embedding layers, 1024 hidden units), all these pre-trained language models are generated by Google™, and available at (Google Research, https://github.com/google-research/bert, Mar. 11, 2020), all of which are incorporated by reference herein in their entirety. It is understood that the disclosed pre-trained language models can be used in some examples. Other pre-trained language models can be used in other examples.

The pre-trained language model comprises a plurality of learnable parameters optimized through training on general, perhaps public, training datasets. However, the model can be fine-tuned to better understand a particular use of language in a specific domain (e.g. finance, education, and the like). The process of fine-tuning adjusts the values of the learnable parameters of the pre-trained language model. In example embodiments, the pre-trained language model is fine-tuned twice, once in the masked language modelling fine-tuning module 304 to generate the masked language modelling of BERT language model (referred to as MLM-BERT language model). The MLM-BERT language model may be tasked to predict randomly masked tokens/words in a given training example. The MLM-BERT language model can be further fine-tuned in the multi-task deep neural network fine-tuning module 306 to generate the multi-task deep neural network fine-tuned BERT language model (referred to as MT-DNN-BERT language model). The MT-DNN-BERT language model may be tasked to train on a variety of different tasks (e.g., intent prediction, sentence similarity, and/or the like).

The masked language modelling fine-tuning module 304 uses the conversation dataset 212 as the training dataset for fine-tuning the pre-trained language model. The masked language modelling fine-tuning module 304 tokenizes the conversation dataset's 212 data samples to generate tokenized data samples of the conversation dataset 212. Further, the masked language modelling fine-tuning module 304 masks at least one token of the tokenized data samples. While fine-tuning the pre-trained language model to generate the MLM-BERT language model, the pre-trained language model is tasked to predict the masked token, and a masked language model loss is computed. The masked language model loss is computed for the pre-trained language model based on the predicted token and the respective token of the data sample of the conversation dataset 212. The respective token of the data sample is the token without the mask. The masked language model loss is a loss function calculated through forward propagation of the tokenized data samples with masked tokens. The masked language model loss is backpropagated through the pre-trained language model to adjust values of the learnable parameters of the pre-trained language model and reduce the masked language model loss. This process is done iteratively. With each iteration, the masked language model loss decreases until the values of the learnable parameters of the pre-trained language model are optimized on the conversation dataset 212. After the pre-trained language model is fine-tuned in the masked language modelling fine-tuning module 304, such fine-tuned pre-trained model is referred to as the MLM-BERT language model, which is tasked to predict the randomly masked token/words.

After generating the MLM-BERT language model, the processor 204 provides the MLM-BERT language model to the multi-task deep neural network fine-tuning module 306 for a second fine-tuning stage. The multi-task deep neural network fine-tuning module 306 uses the question-intent tuple dataset 210 to fine-tune the MLM-BERT language model. The question-intent tuple dataset 210 includes data samples of questions, intents, and tasks. The multi-task deep neural network fine-tuning module 306 generates a multi-task deep neural network model for the tasks in the question-intent tuple dataset 210. The multi-task deep neural network model consists of a plurality of neural network models; each neural network model is trained on data samples of a unique task value of the tasks of the question-intent tuple dataset 210. For example, if there are I data samples, each data sample has a task, so I task values. The I task values are comprised of T unique task values. Therefore, the multi-task deep neural network model consists of T neural network models.

The multi-task deep neural network fine-tuning module 306 implements a method to generate the multi-task deep neural network model. Example embodiments include training the neural network models in parallel where all neural network models, each for a unique task value, are trained concurrently. Other example embodiments include training the neural network models in series by generating a neural network for one unique task value at a time.

Neural networks will be briefly described in general terms. A neural network can include multiple layers of neurons, each neuron receiving inputs from a previous layer, applying a set of weights to the inputs, and combining these weighted inputs to generate an output, which can, in turn, be provided as input to one or more neurons of a subsequent layer.

A layer of neurons uses filters to define the relationship between the outputs of the neurons of the previous layer and the outputs of the neurons of the current layer. A layer of the neural network receives data input, usually in the form of a data array of known dimensions. By applying the set of filters (layers) to the data input, each layer generates data output, typically a data array with known dimensions. A filter comprises a set of weights (also learnable parameters).

In the example of a neural network, training a neural network involves learning or determining the appropriate weight values throughout the network. After being optimally trained to perform a given inference task, the neural network's weights will not all contribute equally to the final inference outputs. Some weights will have high value due to their high contribution, while others will have low value due to their low contribution.

While FIG. 3 describes an example of the UL embedding generator module 100 in more detail, in some embodiments, the pretrained LA embedding module 22 (e.g., see FIG. 1) may have a similar configuration as that of the UL embedding generator module 100 shown in FIG. 3. For example, in some embodiments, the pretrained LA embedding module 22 may include the pretrained LA embedding model (e.g., the LA-BERT embedding model) described above with reference to FIG. 1 as the pretrained language model 302 to generate embeddings (e.g., sentence embeddings), and may further include an MLM-BERT language model and/or an MT-DNN-BERT language model generated through training by fine-tuning the pretrained LA embedding model based on the question-intent tuple dataset 210 and/or the conversation dataset 212 as described above (and as further described in more detail below). Accordingly, redundant description thereof may not be repeated.

Figure 4:
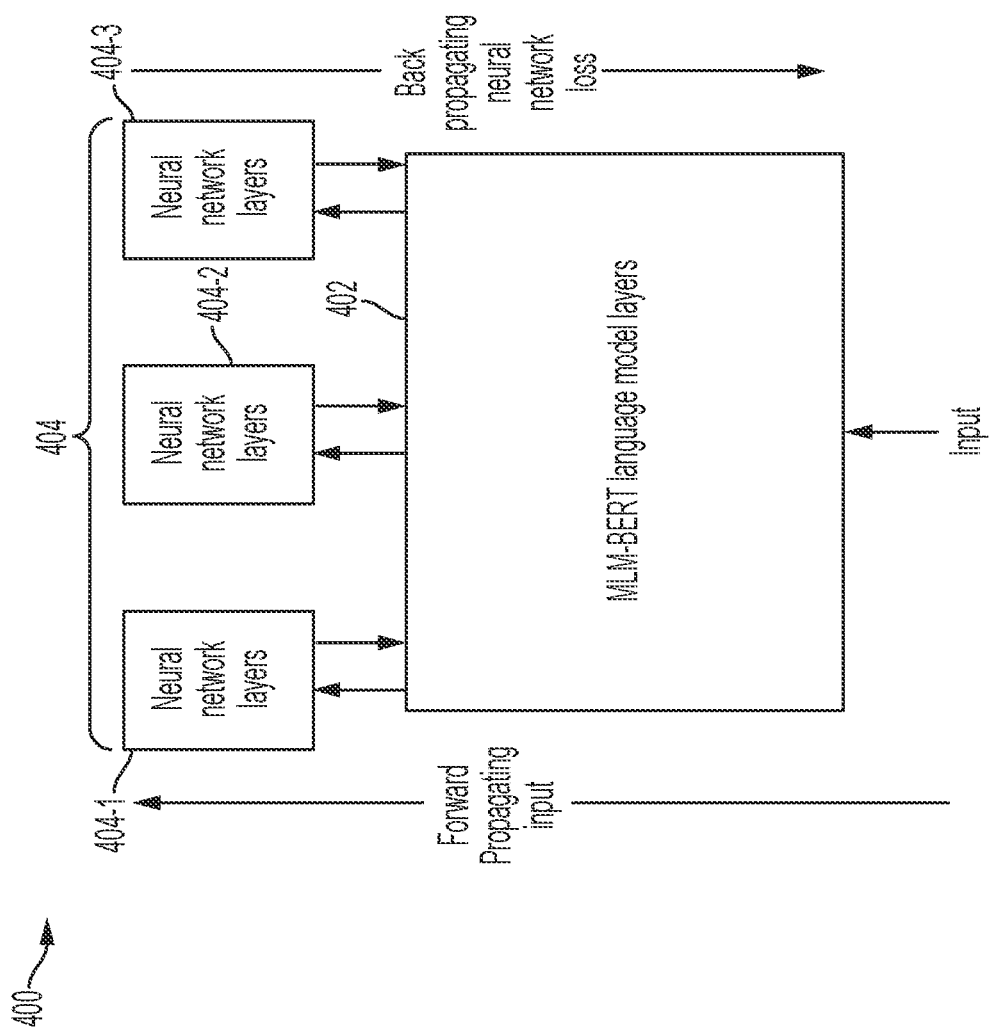
FIG. 4 is a data flow diagram illustrating a fine-tuning method performed in a multi-task deep neural network module, according to one or more embodiments.

FIG. 4 is a data flow diagram illustrating a fine-tuning method performed in the multi-task deep neural network module, according to one or more embodiments. The fine-tuning method 400 is performed in the multi-task deep neural network fine-tuning module 306, which includes MLM-BERT language model layers 402 and a plurality of neural network layers 404. Each neural network layers 404-1, 404-2, 404-3 belongs to, and part of, a respective neural network model trained to predict intents from questions. The multi-task deep neural network fine-tuning module 306 receives data samples of the question intent tuple dataset 210 as input and generates a neural network model for every unique task value. The input is forward propagated from a first layer of the MLM-BERT language model layers 402 to a last layer of one of the neural network layers (404-1, 404-2, and 404-3), depending on the respective network model being trained. As described above, the pre-trained language model includes a plurality of embedding layers. Therefore, the MLM-BERT language model, which is a fine-tuned version of the pre-trained language model, also includes embedding layers, referred to as the MLM-BERT language model layers 402.

In the multi-task deep neural network fine-tuning module 306, each neural network model has a plurality of layers, a subset of layers of the plurality of layers being shared among all neural network models. This shared subset of layers is the layers of the MLM-BERT language model layers 402. Further, each neural network model has a subset of layers specific to the unique task value the neural network model is trained on. The subset of layers specific to a task is not shared among the neural network models; such subsets of layers are depicted as neural network layers 404-1, 404-2, and 404-3.

For each neural network model, a neural network loss for the neural network is computed based on the neural network model's intent prediction of a question of the data sample and the respective intent of the question. The neural network loss is backpropagated, adjusting values of learnable parameters of the respective neural network model layers 404-1, 404-2, or 404-3, and the learnable parameters of the MLM-BERT language model.

When all values of learnable parameters of neural network models are optimized, fine-tuning the MLM-BERT language is completed. The generated model is referred to as the MT-DNN-BERT language model, which is trained on a variety of different tasks (e.g., intent prediction, sentence similarity, and/or the like). It will be appreciated that example embodiments can describe the sequence of generating the MLM-BERT language model and the MT-DNN-BERT language model differently. For example, the MT-DNN-BERT language model can be generated by fine-tuning the pre-trained language model; then, the MLM-BERT language model can be generated by fine-tuning the MT-DNN-BERT. In other example embodiments, only one fine-tuning stage is performed; for example, only the MT-DNN-BERT language model is generated by fine-tuning the pre-trained language model. In another example embodiment, only the MLM-BERT language model is generated by fine-tuning the pre-trained language model. At this stage, the operations performed in the UL embedding generator module 100 are described, and the MT-DNN-BERT language model is trained. The MT-DNN-BERT language model can generate embeddings when applied to data samples during training or input data during inference making. This MT-DNN-BERT language model can be included in the UL embedding generator module 100, and used for inference making, as described in FIG. 1.

Figure 5:
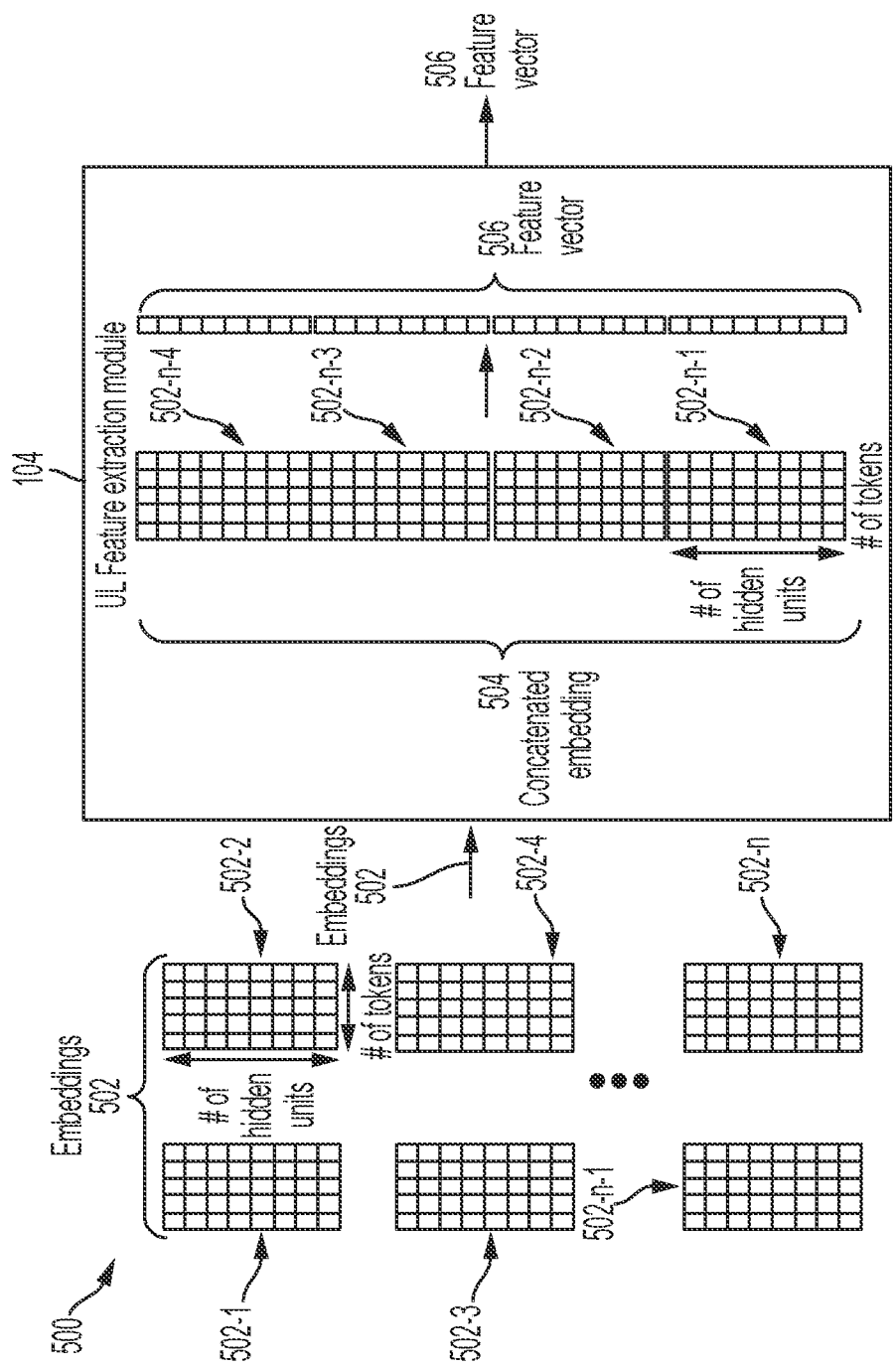
FIG. 5 is an illustrative diagram of a method performed by a feature extraction module, according to one or more embodiments.

FIG. 5 is an illustrative diagram of a method performed by a feature extraction module, according to one or more embodiments. For convenience, FIG. 5 describes a feature extraction module in more detail in the context of the UL feature extraction module 104 shown in FIG. 1. However, in some embodiments, the LA feature extraction module 26 may have a similar configuration as that of the UL feature extraction module 104 described in more detail hereinafter, and thus, redundant description thereof may not be repeated.

FIG. 3 and FIG. 4 described how the MT-DNN-BERT language model included in the UL embedding generator module 100 of FIG. 1 is generated. Referring to FIG. 5, embeddings 502 generated for input data are provided to the UL feature extraction module 104 to extract feature vectors 506. The illustrative diagram 500 describes how a feature vector 506 is extracted from embeddings 502 generated for input data (e.g., a question). Each embedding is the output of an embedding layer (502-1, 502-2, . . . , 502-*n*) of the MT-DNN_BERT language model. For example, if example embodiments use the pre-trained language model BERT-Base Uncased (12 embedding layers, 768 hidden units) described above, then there are 12 embedding layers. Therefore, the output of the respective MT-DNN-BERT model can contain 12 embeddings. Each embedding (502-1, 502-2, . . . , 502-*n*) has a plurality of token embeddings, where there is an embedding for each token of the input data. Each token embedding is a vector of size depending on the number of hidden units of the pre-trained language model. If the BERT-Base Uncased is used, then each token embedding has a length of 768 elements.

The UL feature extraction module 104 receives all embeddings 502. In example embodiments, the UL feature extraction module 104 uses the embeddings of the last four layers before the last layer (i.e. 502-*n*-1, 502-*n*-2, 502-*n*-3, and 502-*n*-4). In other words, if the pre-trained language model has 12 embedding layers, then the UL feature extraction module 104 uses embeddings of embedding layers 8, 9, 10, and 11. The UL feature extraction module 104 concatenates such embeddings to generate the concatenated embedding 504. The concatenated embedding 504 includes an embedding for each token. Each token embedding of the concatenated embedding 504 is a result of concatenating token embedding of a plurality of embeddings 502 (e.g., embeddings of 4 layers in this example). Therefore, if each token embedding is of size 768, then each token embedding of the concatenated embedding 504 is of size 768×4=3072. The feature vector 506 is extracted from the concatenated embedding 504 by computing the average of all token embeddings of the concatenated embedding 504. For example, if the concatenated embedding 504 is of size 3072×5, in the scenario where there are 5 token embeddings, then the feature vector 506 would be of size 3072×1. The feature vector 506 is the output of the UL feature extraction module 104, and is used to train an intent classifier model (e.g., the UL intent classifier model) in the UL intent classifier module 106.

It is understood that using the last four layers before the last layer (e.g., 502-*n*-1, 502-*n*-2, 502-*n*-3, and 502-*n*-4) to generate the concatenated embedding 504 was just an example. Different embedding layers and number of embedding layers may be concatenated to generate the concatenated embedding 504.

Referring back to FIG. 1, the feature vector 506 is used in the UL intent classifier module 106. In FIG. 1, the UL intent classifier model is configured through training to classify feature vectors 506 into intents (e.g., UL intent data). Training the UL intent classifier model can be performed using any suitable classifier or classification model, such as any support vector machine (SVM), neural network, or any other suitable algorithm. In some embodiments, the UL intent classifier module 106 implements an SVM algorithm (e.g., a second SVM or a second classification model) to train the UL intent classifier model. Training the SVM may require a labelled training dataset since SVM is a supervised machine learning algorithm.

Similarly, the feature vector output by the LA feature extraction module 26, or the vector representations output by the pretrained LA embedding module 22, may be used in the LA intent classifier module 28. In FIG. 1, the LA intent classifier model is configured through training to classify feature vectors (or the vector representations) into intents (e.g., LA intent data). Training the LA intent classifier model can be performed using any suitable classifier or classification model, such as any support vector machine (SVM), neural network, or any other suitable classification algorithm. In some embodiments, the LA intent classifier module 28 implements an SVM algorithm (e.g., a first SVM or a first classification model) to train the LA intent classifier model. Training the SVM may require a labelled training dataset since SVM is a supervised machine learning algorithm.

Example embodiments include methods using the question-intent tuple dataset 210 to train the SVM. In such examples, the task value of the question-intent tuple dataset 210 may not be used, and the SVM is trained to classify the questions into intents. In some embodiments, the question-intent tuple dataset 210 and/or the conversation data set 212 may be provided in any suitable language to train the LA intent classification system 20, and if in a language different from the predetermined language of the UL intent classification system 30, may be first machine translated into the predetermined language before training the UL intent classification system 30. Accordingly, each of the LA intent classification system 20 and the UL intent classification system 30 may be trained based on the same training data set, regardless of the language used to generate the training data set. Example embodiments can use a dataset other than the question-intent tuple dataset 210 for training the SVM. The dataset for training the SVM may be an enterprise-specific dataset. The enterprise-specific dataset may include questions and intents specific to the industry of the enterprise developing the chatbot (e.g., finance, education, logistics, transportation, and/or the like). In example embodiments, the enterprise-specific dataset may be collected by the enterprise that is developing and/or training the chatbot, making the chatbot even more tailored towards the needs of the enterprise.

Figure 6:
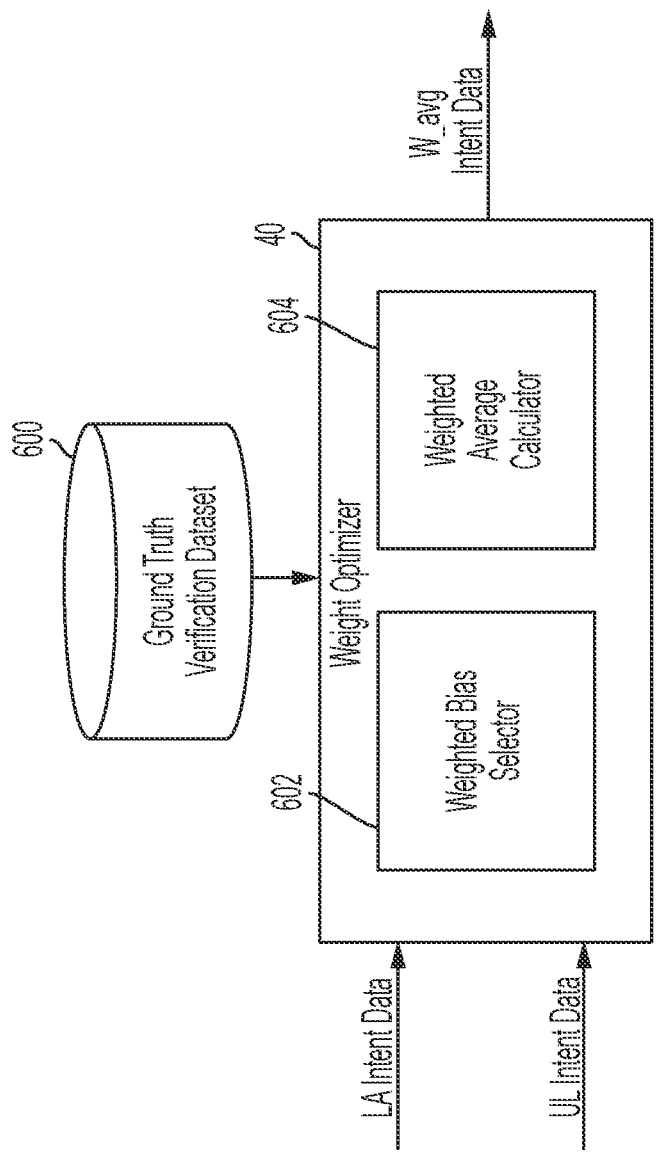
FIG. 6 is a block diagram of a weight optimizer according to one or more embodiments.

FIG. 6 is a block diagram of the weight optimizer according to one or more embodiments. As described above with reference to FIG. 1, in some embodiments, the weight optimizer 40 may include the weight optimization model that uses machine learning and artificial intelligence. For example, the weight optimizer 40 may include a weighted bias selector 602 that generates, during training, the weight optimization model based on a ground truth verification dataset 600 to determine weights (e.g., a suitable bias mix) applied to the LA intent data and the UL intent data. The weight optimizer 40 may further include a weighted average calculator 604 to calculate weighted averages W_avg of the intent data (e.g., between the LA intent data and the UL intent data) based on the generated weight optimization model (e.g., the determined bias mix).

In some embodiments, the weight optimizer 40 may be trained (e.g., based on the ground truth verification dataset 600) after the LA intent classification system 20 and the UL intent classification system 30 have been trained (e.g., based on the question-intent tuple dataset 210 and the conversation dataset 212) to make the intent predictions (e.g., to output the LA intent data and the UL intent data). For example, in some embodiments, the ground truth verification dataset 600 may be a labeled dataset different from (or an unused sub-set of) those used to train the LA intent classification system 20 and the UL intent classification system 30 for the intent classification tasks. Thus, when training the weight optimizer 40, the predictions output by the LA intent classification system 20 and the UL intent classification system 30, which are based on the questions in the ground truth verification dataset 600, may be based on new or different data samples from those used to train the LA intent classification system 20 and the UL intent classification system 30 to make the predictions. For example, the ground truth verification dataset 600 may correspond to a labeled enterprise-specific dataset (e.g., provided by a customer) in a particular language, for example, when configuring (e.g., testing and/or training) the multilingual intent classification system 10 for the particular language. In other examples, the ground truth verification dataset 600 may correspond to readily available labeled datasets for intent prediction tasks in one or more suitable languages.

In some embodiments, the ground truth verification dataset 600 may include data samples, each of the data samples including text (e.g. questions, utterances, and/or the like) and a label corresponding to the intent for each question, utterance, and/or the like contained therein. During training of the weight optimizer 40, the text of the data samples of the ground truth verification dataset 600 may be input to the LA intent classification system 20 and the UL intent classification system 30 to make the intent predictions (e.g., the LA intent data and the UL intent data) for the text of each of the data samples. The text of the ground truth verification dataset 600 may be input to the LA intent classification system 20 in any suitable language, and if the text of the ground truth verification dataset 600 is in a language different from the predetermined language understood by the UL intent classification system 30, the text of the ground truth verification dataset 600 may first be machine translated into the predetermined language before being input into the UL intent classification system 30.

Each of the LA intent classification system 20 and the UL intent classification system 30 may predict one or more class labels for the text of each of the data samples contained in the ground truth verification dataset 600, and a confidence score for each of the class labels. For example, for the utterance "Printer keeps restarting," the LA intent classification system 20 may output a "troubleshooting" class label with a confidence score of 0.98, a "printer restart instructions" class label with a confidence score of 0.23, and a "printer products" class label with a confidence score of 0.08. On the other hand, for the same utterance, the UL intent classification system 30 may output a "troubleshooting" class label with a confidence score of 0.89, a "printer restart instructions" class label with a confidence score of 0.34, and a "printer ink types" class label with a confidence score of 0.04. As shown in the above non-limiting example, the labels and/or the confidence scores output by the LA intent classification system 20 and the UL intent classification system 30 may be different from each other. For example, the differences therebetween may be the result of a translational error in the machine translation of the utterance, different domains that the embedding modules of the LA intent classification system 20 and UL intent classification system 30 are pretrained for, and/or the like.

Accordingly, the weighted bias selector 602 may generate the weight optimization model, through training, to apply suitable weights to the intent predictions output from the LA intent classification system 20 and the UL intent classification system 30 based on the labels in the ground truth verification dataset 600. The weighted average calculator 604 may calculate a weighted average W_avg between the LA intent data and the UL intent data based on the weights determined by the weight optimization model, and the weight optimization model may adjust the weights based on a comparison of the weighted average W_avg with the corresponding label in the ground truth verification dataset 600. In other words, the weight optimization model may be trained to determine a suitable bias mix (e.g., suitable weights) for calculating the weighted average between the LA intent data and the UL intent data that results in an improved confidence score (e.g., an improved averaged confidence score) of a correct label based on the ground truth label.

As discussed in more detail below with reference to FIG. 7, in some embodiments, the weights may be applied in predetermined intervals (e.g., [0.1], [0.2, 0.8], [0.4, 0.6], and the like), such that the bias mix may be adjusted in the predetermined intervals to be applied to the LA intent data and the UL intent data when calculating the weighted average. In this case, the weighted average based on each of the predetermined intervals for all of (or some suitable subset of) the data samples in the ground truth verification dataset 600 may first be calculated, and each of the weighted averages may be compared with the corresponding ground truth label to determine the suitable bias mix that results in an improved average confidence score for the correct label.

However, the present disclosure is not limited thereto, and as would be understood by those having ordinary skill in the art, the weights may be learned via any suitable machine learning algorithm, such as a reinforcement learning algorithm or the like. In this case, rather than calculating the weighted average based on each of the predetermined intervals, the bias mix may be dynamically adjusted based on suitable actions, states, and rewards. Further, in some embodiments, the weights may be dynamically adjusted or adjusted with more granularity as needed or desired, for example, according to a type of intent inference, quality of machine translations for a particular language, and/or the like. In some embodiments, the weight optimization model may calculate a loss between the weighted average W_avg and the corresponding label of the data sample, and the loss may be backpropagated to adjust values of learnable parameters of the weight optimization model that results in a reduction or minimization of the loss.

Figure 7:
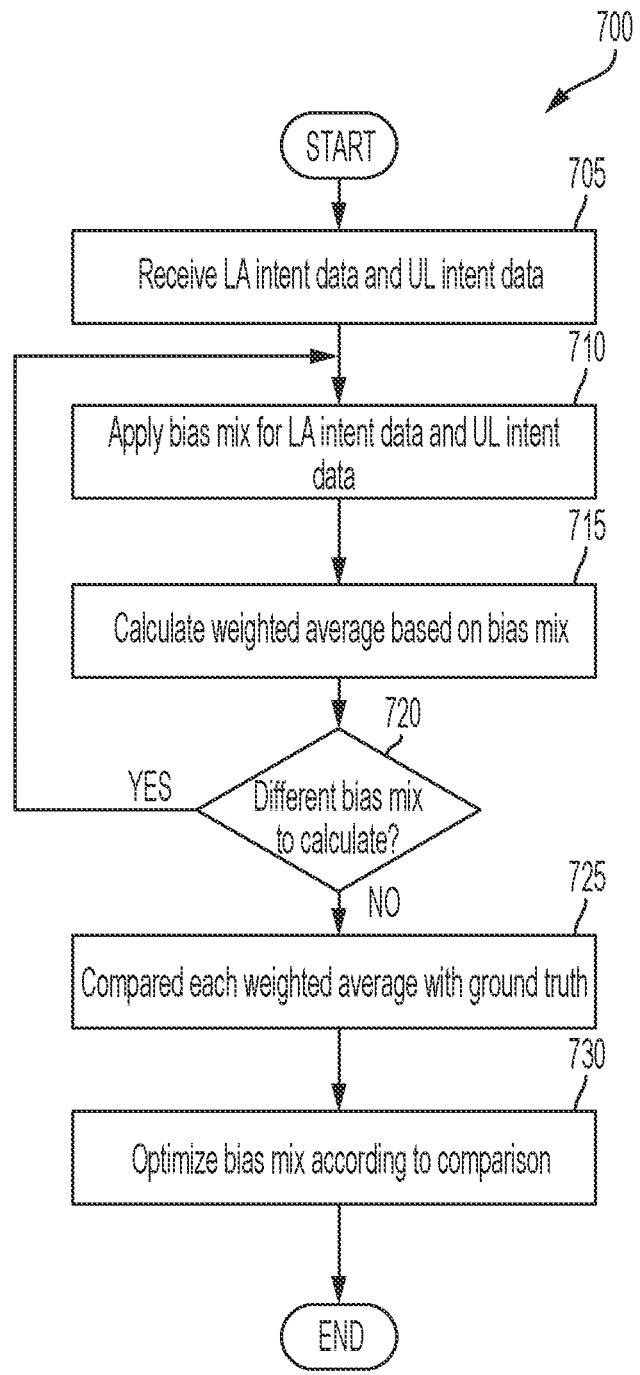
FIG. 7 is a flow diagram of an example method for optimizing a bias mix according to one or more embodiments.

FIG. 7 is a flow diagram of an example method for optimizing a bias mix according to one or more embodiments. The method 700 shown in FIG. 7 may be performed by the weight optimizer 40 shown in FIG. 6. However, the present disclosure is not limited thereto, and the operations shown in the method 700 may be performed by any suitable one of the components and elements or any suitable combination of the components and elements of those of one or more embodiments described above. Further, the present disclosure is not limited to the sequence or number of the operations of the method 700 shown in FIG. 7, and can be altered into any desired sequence or number of operations as recognized by a person having ordinary skill in the art. For example, in some embodiments, the order may vary, or the method 700 may include fewer or additional operations.

Referring to FIGS. 6 and 7, the method 700 may start, and LA intent data and UL intent data may be received at block 705. For example, the LA intent classification system 20 may generate the LA intent data (e.g., the first intent) for the text of each data sample of a ground truth verification dataset 600, and the UL intent classification system 30 may generate the UL intent data (e.g., the second intent) for the text of each data sample of the ground truth verification dataset 600. Thus, the LA intent data (e.g., the first intent) and the UL intent data (e.g., the second intent) may correspond to each other (e.g., may be based on the same utterance), but may be different (e.g., may have different labels and/or confidence scores) from each other as discussed above.

For example, the text of the ground truth verification dataset 600 may be input to the LA intent classification system 20 in any suitable language, and if the text of the ground truth verification dataset 600 is in a language different from the predetermined language understood by the UL intent classification system 30, the text of the ground truth verification dataset 600 may first be machine translated into the predetermined language before being input into the UL intent classification system 30. Each of the LA intent data and the UL intent data may include one or more class labels for the text of each of the data samples contained in the ground truth verification dataset 600, and a confidence score for each of the class labels, but these may not be the same as each other as discussed above.

A bias mix for the LA intent data and the UL intent data may be applied at block 710, and a weighted average may be calculated based on the bias mix at block 715. For example, in some embodiments, the weighted bias selector 602 may apply an initial bias mix interval (e.g., a first bias mix interval), and the weighted average calculator 604 may calculate the weighted average for the predictions of each of the data samples based on the initial bias mix interval. In some embodiments, the initial bias mix interval may be an initial interval from among a plurality of predetermined bias mix intervals for determining the initial weights applied to each of the LA intent data and the UL intent data. For example, the initial bias mix interval may initially apply 100% weight to the LA intent data and 0% weight to the UL intent data (e.g., [1, 0]), such that the weighted average may initially be calculated based on 100% of the LA intent data. In another example, the initial bias mix interval may initially apply 50% weight to the LA intent data and 50% weight to the UL intent data (e.g., [0.5, 0.5]), such that the LA intent data and the UL intent data are initially weighed equally in the weighted average. However, these are provided merely as examples, and thus, any suitable initial interval may be applied as the initial bias mix interval, as would be appreciated by those having ordinary skill in the art. Further, in some embodiments, the weighted bias selector 602 may dynamically adjusted the bias mix intervals to calculate the weighted averages, for example, based on results of one or more previous adjustments, instead of based on each of the predetermined intervals.

A determination may be made whether any different bias mix should be calculated at block 720. For example, in some embodiments, the weight optimizer 40 (e.g., the weighted bias selector 602) may determine whether weighted averages should be calculated for any more bias mixes from among the plurality of predetermined bias mix intervals. As an example, the weight optimizer 40 may be configured to change the bias mix intervals by predetermined steps (e.g., 0.2, 1, 1.5, and/or the like) such that the weighted average is calculated for each of the predetermined steps. Accordingly, if there are more bias mix intervals to consider (e.g., YES at block 720), the method 700 may continue from block 710 to apply the different bias mix, and a weighted average based on the different bias mix may be calculated at block 715.

On the other hand, if there are no more predetermined bias mixes to consider (e.g., NO at block 720), each of the calculated weighted averages may be compared with a ground truth at block 725. For example, in some embodiments, the weighted bias selector 602 may determine a final predicted label for each data sample (e.g., based on the largest weighted average confidence score of one of the predicted labels for each data sample), and may compare the final predicted label for each data sample with a corresponding ground truth label.

The bias mix may be optimized based on the comparison at block 730, and the method 700 may end. For example, the weighted bias selector 602 may determine an optimal bias mix that results in improved performance of the final predicted labels of the data samples. In other words, the weighted bias selector 602 may determine the weights applied to the LA intent data and the UL intent data that results in an improvement of the confidence scores of the final predicted labels based on the comparison with the ground truth labels. The optimal bias mix may be determined based on the weighted average predictions of all of the data samples, or some suitable subset of the data samples. During inference, the weighted average calculator 604 may calculate the weighted average W_avg of the LA intent data and the UL intent data based on the optimal bias mix determined during the training.

Figure 8:
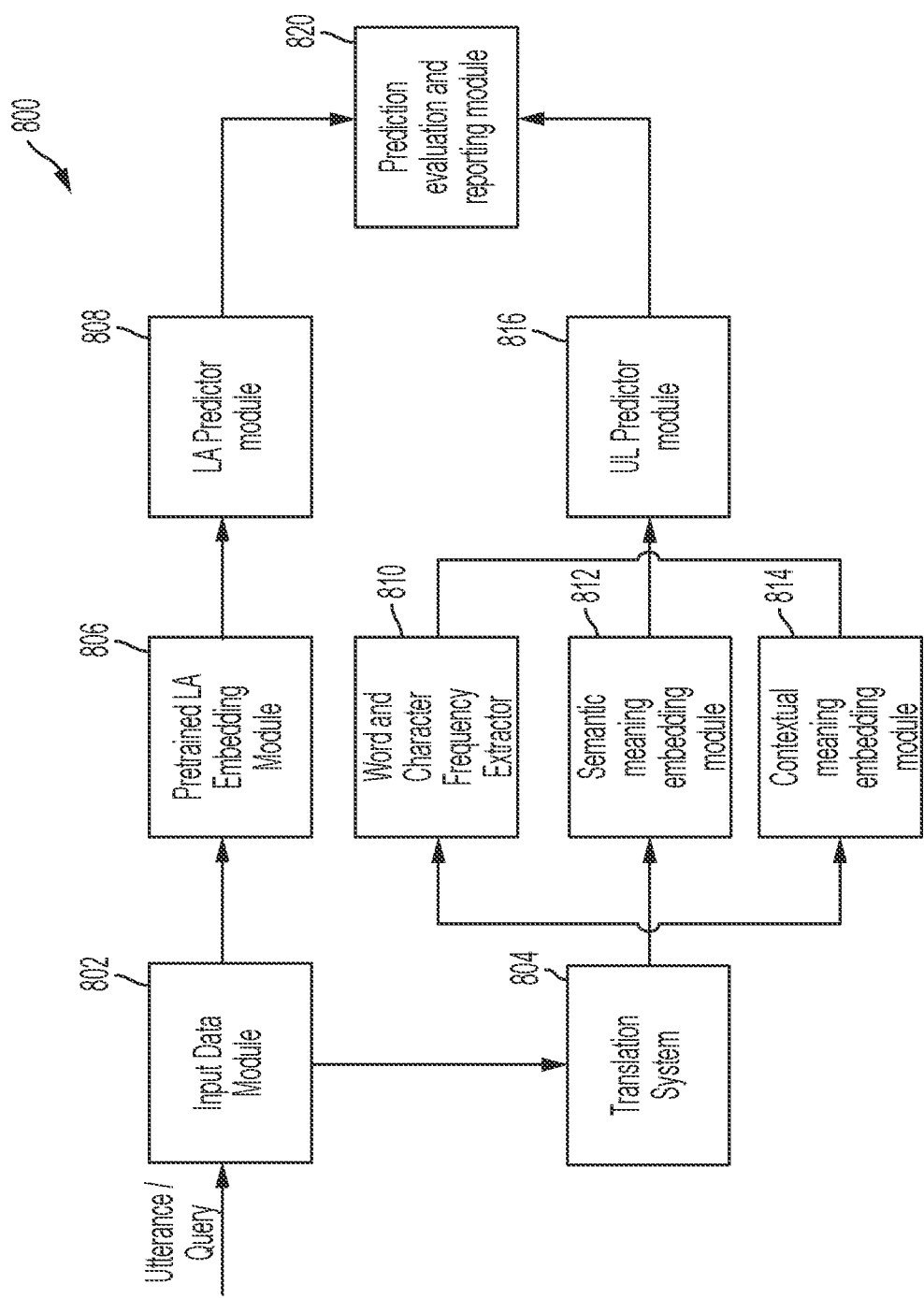
FIG. 8 is a block diagram of a multilingual chatbot system according to one or more embodiments.

FIG. 8 is a block diagram of a multilingual chatbot system according to one or more embodiments. The multilingual chatbot system 800 receives a query in any suitable (e.g., user preferred) language from a user through the input data module 802, which may implement a graphical user interface. The input data module 802 outputs input data, which is the query in text format. The query may be a text typed directly into the graphical user interface of the input data module 802, or a spoken query, which is converted to text through a speech-to-text converter (not shown). The input data module 802 may output the input data as-is (e.g., in the language in which it was received) to the pretrained LA embedding module 806. The input data module 802 may determine a language type of the query, and if the language type is in a different language than that of which the UL intent classification system 30 is trained with, the input data may first be machine translated through a translation module (e.g., a translation system) 804 into the language (e.g., the predetermined language) of the UL intent classification system 30. The input data may include a plurality of words representing the user question in the query, for example, "Has my package been shipped yet?", "When will my package arrive", and/or the like.

The input data 802 may not be processed directly by subsequent modules of the multilingual chatbot system 800 as words, but may be converted to sentence embeddings (e.g., vector representations) in the pretrained LA embedding module 806, and converted to numerical representations in numerical representation modules of the UL intent classification system 30. For example, the numerical representation modules of the UL intent classification system 30 may include word and character frequency extractor module 810, semantic meaning embedding module 812, and contextual meaning embedding module 814. In some embodiments, at least one of the semantic meaning embedding module 812 or the contextual meaning embedding module 814 may include, or may be implemented similarly to, the UL embedding generator module 100 described above. For example, in some embodiments, the contextual meaning embedding module 814 may be implemented as the UL embedding generator module 100 described above. Further, example embodiments of the multilingual chatbot systems 800 may not need to have all the mentioned numerical representation modules (e.g., 810, 812, and 814).

The pretrained LA embedding module 806 may include a pretrained language agnostic (LA) embedding model that may include the LA-BERT embedding model that is pretrained to perform translation ranking tasks (e.g., a language translation domain) in a multilingual sentence embedding space. The pretrained LA embedding module 806 may be the same as or substantially the same as one or more embodiments of the pretrained LA embedding module 22 described above, and thus, redundant description thereof may not be repeated. The sentence embeddings generated by the pretrained LA embedding module 806 may be provided to the LA predictor module 808 to make the intent predictions (e.g., the first intent or the LA intent data).

The LA predictor module 808 can receive the sentence embeddings from the pretrained LA embedding module 806, and may predict answers (e.g., the first intent or the LA intent data). The LA predictor module 808 may be the same or substantially the same as the LA predictor module 24 according to one or more embodiments described above, and thus, redundant description thereof may not be repeated. For example, in some embodiments, the LA predictor module 808 can include at least the LA intent classifier module 28 of the multilingual intent classification system 10 described above. In some embodiments, the LA predictor module 808 may further include the LA feature extraction module 26 described above. The predicted answers of the LA predictor module 808 may include one or more labels for the question, and a confidence score for each of the labels indicating correctness likelihood.

The word and character frequency extractor module 810 receives the input data (e.g., the translated input data), and may represent how frequently each word in the input data and each n-character sequence appear in the multilingual chatbot system's 800 training datasets. For example, in some embodiments, the word and character frequency extractor module 810 may utilize a suitable algorithm, such as Term Frequency-Inverse Document Frequency (TF-IDF). No word analysis with respect to the relationships between words can be performed in the word and character frequency extractor module 810. Further, the word and character frequency extractor module 810 can provide the UL predictor module 816, responsible for generating answers (e.g., second intent or the UL intent data), with information to improve the accuracy of the answers.

The semantic meaning embedding module 812 receives the input data (e.g., the translated input data) and generates embeddings for the input data. The embeddings generated by the semantic meaning embedding module 812 are influenced by the industry of the enterprise implementing the multilingual chatbot system 800. For example, a word's embeddings of a telecommunications industry would have different embeddings than those in the finance or transportation industries.

The contextual meaning embedding module 814 also receives input data (e.g., the translated input data) and generates embeddings for the input data, but such embeddings capture the contextual meaning of words in the input data. Unlike the semantic meaning embedding module 812, the contextual meaning embedding module 814 dynamically adjusts the word embeddings based on other words in the input data. The contextual meaning embedding module 814 enables the UL predictor module 816 to better understand the specific meaning of a word in the input data. For example, the meaning of the word "park" varies between "where can I park my car?" and "where is the closest national park."

The UL predictor module 816 can receive input from the word and character frequency extractor module 810, the semantic meaning embedding module 812, and the contextual meaning embedding module 814, and predicts answers (e.g., the second intent or the UL intent data). The UL predictor module 816 can include a plurality of modules, including the UL feature extraction module 104 and the UL intent classifier module 106 of the multilingual intent classification system 10 described above. The predicted answers of the UL predictor module 816 may include one or more labels for the question, and a confidence score for each of the labels indicating correctness likelihood.

The predicted answers output by the LA predictor module 808 and the UL predictor module 816 are provided to the prediction evaluation and reporting module 820, which determines weighted averages of the confidence scores of the predicted labels, and which predicted answer to provide to the user, if any. For example, in some embodiments, the prediction evaluation and reporting module 820 may include the weighted average calculator 604 of the weight optimizer 40 described above with reference to FIG. 6. The weighted average calculator 604 may calculate weighted averages, based on the optimized bias mix determined during training, between the confidence scores output for each label predicted by the LA predictor module 808 and the UL predictor module 816. The prediction evaluation and reporting module 820 may determine which predicted label, from among these calculated weighted average confidence scores, if any, can be provided as the predicted answer to the user.

For example, in some embodiments, the prediction evaluation and reporting module 820 may include a plurality of confidence thresholds to compare with each weighted average confidence score. The weighted average confidence scores are compared to a first threshold. If any weighted average confidence scores are greater than the first threshold, the respective predicted answer (e.g., the respective predicted label) with the highest weighted average confidence score is reported to the user. However, if none of the weighted average confidence scores is greater than the first threshold, the prediction evaluation and reporting module 820 compares the weighted average confidence scores to a second threshold. If any weighted average confidence scores are greater than the second threshold, the prediction evaluation and reporting module 820 requests clarifications from the user. The clarification request may be reported to the user along with at least one of the predicted answers (e.g., the predicted labels) with a weighted average confidence score above the second threshold. If none of the weighted average confidence scores is above the second threshold, the prediction evaluation and reporting module 820 reports to the user that the question in the query was not understood. The first threshold and the second threshold may be determined during training along with the weight optimizer 40 in a similar optimization manner. It should be understood that the predicted answer, the clarification request, and the reports to the user may be provided in the original language (e.g., the user preferred language) of the query.

Figure 9:
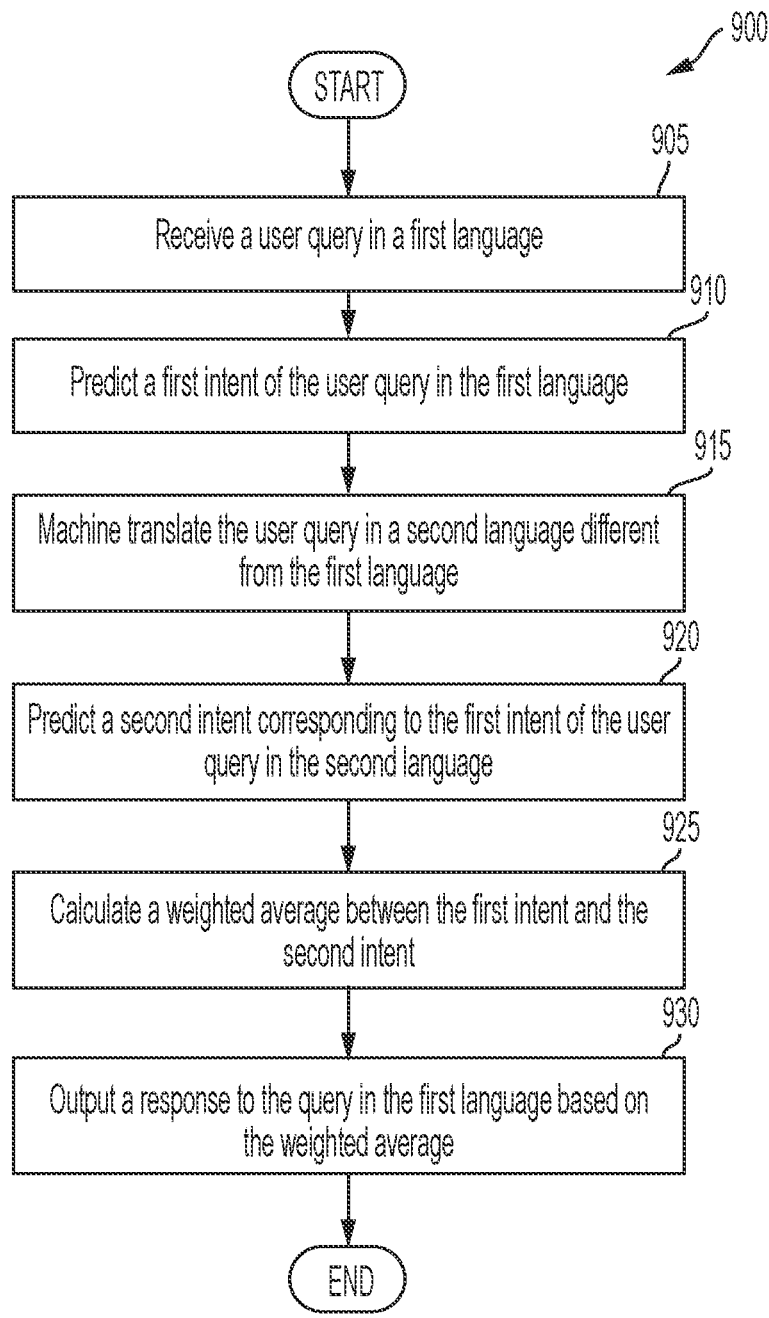
FIG. 9 is a flow diagram of an example method for outputting a response to an utterance/query by the multilingual chatbot system of FIG. 8, according to one or more embodiments.

FIG. 9 is a flow diagram of an example method for outputting a response to an utterance/query by the multilingual chatbot system of FIG. 8, according to one or more embodiments. The method 900 shown in FIG. 9 may be performed by the multilingual chatbot system 800 shown in FIG. 8. However, the present disclosure is not limited thereto, and the operations shown in the method 900 may be performed by any suitable one of the components and elements or any suitable combination of the components and elements of those of one or more embodiments described above. Further, the present disclosure is not limited to the sequence or number of the operations of the method 900 shown in FIG. 9, and can be altered into any desired sequence or number of operations as recognized by a person having ordinary skill in the art. For example, in some embodiments, the order may vary, or the method 900 may include fewer or additional operations.

Referring to FIGS. 8 and 9, the method 900 may start, and a user query may be received in a first language at block 905. For example, the user query may be received by the input data module 802 in any user preferred language. In the example shown in FIG. 9, the first language may be assumed to be different from the predetermined language that the UL intent classification system 30 is trained on.

A first intent may be predicted for the user query in the first language at block 910. For example, in some embodiments, the input data module 802 may provide the user query (e.g., the input data) in the language (e.g., the user preferred language) that it was received to the pretrained LA embedding module 806, and the LA predictor module 808 may predict the first intent (e.g., the LA intent data) based on the sentence embeddings output by the pretrained LA embedding module 806. The first intent may include one or more labels for the predicted intent of the user query, and a confidence score for each of the one or more labels.

The user query may be machine translated into a second language different from the first language at block 915. For example, as described above, the user query may be received in the first language (e.g., the user preferred language) that is different from the predetermined language (e.g., the second language) that the UL intent classification system 30 is trained on. In this case, the input data module 802 may provide the user query to the translation system 804 to machine translate the user query into the second language from the first language.

A second intent corresponding to the first intent of the user query may be predicted in the second language at block 920. For example, in some embodiments, the translation system 804 may provide the translated user query (e.g., in the second language) to the UL intent classification system 30 (e.g., to the UL embedding generator module 100 thereof, or to each of the word and character frequency extractor module 810, the semantic meaning embedding module 812, and the contextual meaning embedding module 814 thereof) to generate embeddings of the translated user query, and the UL predictor module 816 may predict the second intent (e.g., the UL intent data) based on the generated embeddings. The second intent may correspond to the first intent (e.g., may be based on the same user query), and may include one or more labels for the predicted intent of the user query, and a confidence score for each of the one or more labels.

A weighted average may be calculated between the first intent and the second intent at block 925. For example, in some embodiments, the prediction evaluation and reporting module 820 (e.g., the trained weighted average calculator 604 thereof) may calculate a weighted average between the confidence scores of a predicted label of each of the first intent and the second intent based on a suitable bias mix (e.g., the optimal bias mix).

A response to the user query in the first language may be output based on the weighted average at block 930, and the method 900 may end. For example, in some embodiments, the prediction evaluation and reporting module 820 may determine the response based on a comparison of the weighted average and one or more confidence thresholds as discussed above.

While FIG. 9 assumes that the user query is received in a language different from the predetermined language that the UL intent classification system 30 is trained on, the present disclosure is not limited thereto. For example, as would be appreciated by those having ordinary skill in the art, if the user query is received in the predetermined language (e.g., the second language), then the machine translation process of block 915 may be omitted, such that each of the first intent and the second intent may be based on the same user query in the same predetermined language. Further, as would be appreciated by those having ordinary skill in the art, the process of predicting the first intent and the second intent of blocks 910 and 920 may be performed concurrently or sequentially with each other as needed or desired.

Figure 10:
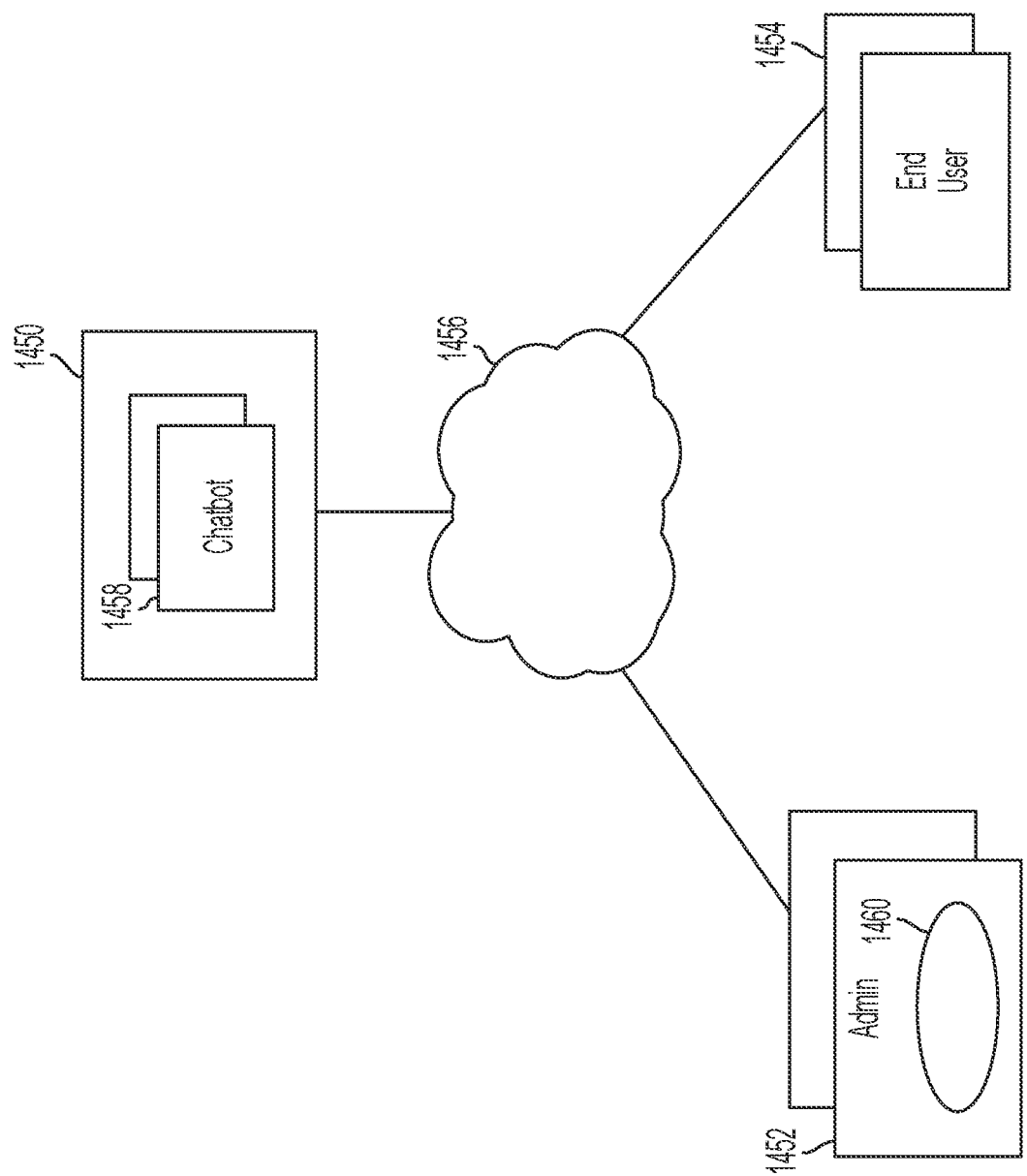
FIG. 10 is a block diagram of a network environment for employing and training chatbots according to one or more embodiments.

FIG. 10 is a block diagram of a network environment for employing and training chatbots according to one or more embodiments. The network environment includes a computing system 1450 coupled to one or more administrator devices 1452 and one or more end user devices 1454 over a data communications network 1456. The data communications network 1456 may be a local area network (LAN), private wide area network (WAN), and/or the public Internet.

The computing system 1450 may host one or more chatbot systems 1458 for handling interactions with the end user devices 1454. The chatbot system 1458 may be similar to the multilingual intent classification system 10 of FIG. 1 and/or the multilingual chatbot system 800 of FIG. 8. The chatbot system 1458 may be configured to handle interactions on behalf of a particular business or enterprise, or on behalf of multiple businesses or enterprises. For example, a separate instance of a chatbot system may be provided for each separate enterprise for handling interactions of that enterprise.

The administrator device 1452 may be a computing device accessed by a chatbot administrator for configuring and maintaining the chatbot system 1458 for a particular enterprise. For example, the chatbot administrator may use the administrator device 1452 to train the machine learning models of the chatbot system 1458 as described above.

The administrator device 1452 may be a desktop, laptop, and/or any other computing device conventional in the art. In this regard, the administrator device 1452 may include an administrator platform 1460. The administrator platform 1460 may be used by the chatbot administrator to interface with a portal of the chatbot system 1458 to configure, train, and maintain the chatbot system. In one embodiment, the administrator platform 1460 is downloaded as a software application on the administrator device 1452. In some embodiments, the administrator platform 1460 takes the form of a web browser, and access of the portal is over the Internet.

The end user device 1454 may also be a desktop, laptop, and/or any other computing device conventional in the art. A customer, potential customer, or other end user (collectively referenced as an end user) desiring to receive services from the contact center may initiate communications to the chatbot system 1458 using the end user device 1454. For example, the end user may formulate a query, and transmit the query to the chatbot system 1458 as a chat message, text message, social media message, and/or the like. The chatbot system 1458 may process the query and determine a user intent. Once the intent is determined, the chatbot may output an answer in response to the query.

In the various embodiments, the terms "interaction" and "communication" are used interchangeably, and generally refer to any real-time and non-real time interaction using, for example, chats, text messages, social media messages, and/or the like.

In one embodiment one or more of the systems, servers, devices, controllers, engines, and/or modules (collectively referred to as systems) in the afore-described figures are implemented via hardware or firmware (e.g., ASIC) as will be appreciated by a person of skill in the art. The one or more of the systems, servers, devices, controllers, engines, and/or modules may also be a software process or thread, running on one or more processors, in one or more computing devices.

Figure 11:
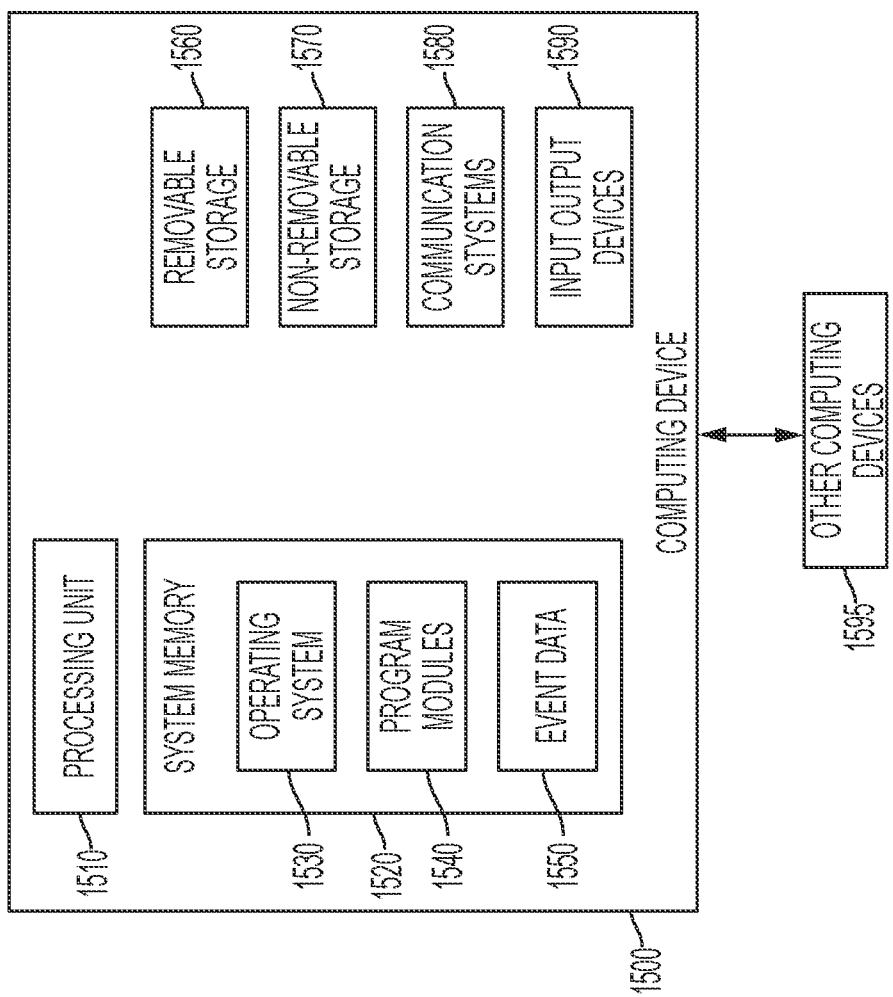
FIG. 11 is a block diagram of a computing device according to one or more embodiments.

FIG. 11 is a block diagram of a computing device according to one or more embodiments. The computing device 1500 may include at least one processing unit (e.g., one or more processors) 1510 and a system memory 1520. The system memory 1520 may include, but is not limited to, volatile storage (e.g., random access memory), non-volatile storage (e.g., read-only memory), flash memory, or any combination of such memories. The system memory 1520 may also include an operating system 1530 that controls the operation of the computing device 1500 and one or more program modules 1540 including computer program instructions. A number of different program modules and data files may be stored in the system memory 1520. While executing on the processing unit 1510, the program modules 1540 may perform the various processes described above.

The computing device 1500 may also have additional features or functionality. For example, the computing device 1500 may include additional data storage devices (e.g., removable and/or non-removable storage devices) such as, for example, magnetic disks, optical disks, or tape. These additional storage devices are labeled as a removable storage 1560 and a non-removable storage 1570.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In some embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

According to one embodiment, the computing device 1500 is configured to communicate with other computing devices over a network interface in a network environment. The network environment may be a virtual network environment where the various components of the network are virtualized. For example, the chatbot systems 10, 1458 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

The terminology used herein is for the purpose of describing particular embodiments only and is not intended to be limiting. Also, unless explicitly stated, the embodiments described herein are not mutually exclusive. Aspects of the embodiments described herein may be combined in some implementations.

In regards to the processes in the flow diagrams of FIGS. 7 and 9, it should be understood that the sequence of steps of the processes are not fixed, but can be modified, changed in order, performed differently, performed sequentially, concurrently, or simultaneously, or altered into any desired sequence, as recognized by a person of skill in the art.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Although some embodiments of chatbot systems and methods for training and using the chatbot systems have been specifically described and illustrated herein, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A method comprising:
   receiving a user query;
   generating first embedding data for the user query via a language agnostic machine learning embedding model;
   predicting a first intent probability distribution for the user query based on the first embedding data;
   generating second embedding data for the user query via a unilingual machine learning embedding model; and
   predicting a second intent probability distribution for the user query based on the second embedding data,
   wherein the second intent probability distribution corresponds to the first intent probability distribution, and
   wherein the unilingual machine learning embedding model comprises a plurality of embedding layers, and the second embedding data comprises a plurality of embeddings corresponding to features of the user query embedded by the plurality of embedding layers.

2. The method of claim 1, wherein the language agnostic machine learning embedding model is a pretrained language agnostic bidirectional encoder representations from transformers (BERT) model.

3. The method of claim 1, wherein the first embedding data comprises vector representations of text in the user query.

4. The method of claim 3, wherein the first intent probability distribution for the user query is predicted by a first classification model based on the vector representations in the first embedding data.

5. The method of claim 1, further comprising generating a feature vector by concatenating the plurality of embeddings.

6. The method of claim 5, wherein the second intent probability distribution for the user query is predicted by a second classification model based on the feature vector.

7. The method of claim 1, further comprising:
   applying weights to the first intent probability distribution and the second intent probability distribution; and
   calculating a weighted average between the first intent probability distribution and the second intent probability distribution based on the weights.

8. A method comprising:
   receiving a user query;
   generating first embedding data for the user query via a language agnostic machine learning embedding model;
   predicting a first intent probability distribution for the user query based on the first embedding data;
   generating second embedding data for the user query via a unilingual machine learning embedding model;
   predicting a second intent probability distribution for the user query based on the second embedding data; and
   translating the user query from a first language to a second language understood by the unilingual machine learning embedding model,
   wherein the second intent probability distribution corresponds to the first intent probability distribution, and
   wherein the generating of the first embedding data for the user query is based on the user query in the first language, and the generating of the second embedding data for the user query is based on the user query translated to the second language.

9. A system comprising:
   one or more processors; and
   memory comprising instructions that, when executed by the one or more processors, cause the one or more processors to:
   receive a user query in a first language;
   predict a first intent probability distribution for the user query in the first language;
   translate the user query into a second language different from the first language;
   predict a second intent probability distribution for the user query in the second language, the second intent probability distribution corresponding to the first intent probability distribution;

calculate a weighted average between the first intent probability distribution and the second intent probability distribution; and output a response to the user query based on the weighted average, wherein the instructions further cause the one or more processors to generate second embedding data for the user query in the second language, wherein the predicting of the second intent probability distribution is based on the second embedding data, and wherein the second embedding data is generated via a plurality of embedding layers, and comprises a plurality of embeddings corresponding to features of the user query embedded by the plurality of embedding layers.

10. The system of claim 9, wherein the instructions further cause the one or more processors to generate first embedding data for the user query in the first language, and wherein the predicting of the first intent probability distribution is based on the first embedding data.

11. The system of claim 10, wherein the first embedding data is generated by utilizing a pretrained language agnostic bidirectional encoder representations from transformers (BERT) model.

12. The system of claim 11, wherein the first embedding data comprises vector representations of text in the user query.

13. The system of claim 12, wherein the first intent probability distribution for the user query is predicted utilizing a first support vector machine based on the vector representations in the first embedding data.

14. The system of claim 9, wherein the instructions further cause the one or more processors to generate a feature vector by concatenating the plurality of embeddings.

15. The system of claim 14, wherein the second intent probability distribution for the user query is predicted utilizing a second support vector machine based on the feature vector.

16. A system comprising:
- a pretrained language agnostic transformers model configured to generate first embeddings of a user query received in a first language;
- a plurality of embedding layers configured to generate second embeddings of the user query in a second language different from the first language;
- a first classification model configured to predict a first intent probability distribution for the user query based on the first embeddings;
- a second classification model configured to predict a second intent probability distribution for the user query based on the second embeddings, the second intent probability distribution corresponding to the first intent probability distribution; and
- a weighted average calculator configured to calculate a weighted average between the first intent probability distribution and the second intent probability distribution, wherein the weighted average is used to generate a response to the user query, wherein the first classification model and the second classification model are trained based on training examples in a combination of different languages, wherein the first classification model is trained based on an original language of the training examples, and wherein the second classification model is trained based on a machine translation of the training examples from the original language to the second language, when the original language is different from the second language.

* * * * *